(12) United States Patent
Gobriel et al.

(10) Patent No.: US 10,237,171 B2
(45) Date of Patent: Mar. 19, 2019

(54) EFFICIENT QOS SUPPORT FOR SOFTWARE PACKET PROCESSING ON GENERAL PURPOSE SERVERS

(71) Applicant: INTEL CORPORATION, Santa Clara, CA (US)

(72) Inventors: Sameh Gobriel, Hillsboro, OR (US); Ren Wang, Portland, OR (US); Eric K. Mann, Hillsboro, OR (US); Christian Maciocco, Portland, OR (US); Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 40 days.

(21) Appl. No.: 15/270,377

(22) Filed: Sep. 20, 2016

(65) Prior Publication Data

US 2018/0083866 A1   Mar. 22, 2018

(51) Int. Cl.
| | |
|---|---|
| *H04L 1/00* | (2006.01) |
| *H04L 12/721* | (2013.01) |
| *H04L 12/851* | (2013.01) |
| *H04L 12/863* | (2013.01) |
| *H04L 12/751* | (2013.01) |
| *H04L 12/715* | (2013.01) |

(52) U.S. Cl.
CPC .............. *H04L 45/38* (2013.01); *H04L 45/02* (2013.01); *H04L 45/64* (2013.01); *H04L 47/2441* (2013.01); *H04L 47/6215* (2013.01)

(58) Field of Classification Search
CPC ..... H04L 47/6215; H04L 45/02; H04L 45/64; H04L 45/38; H04L 47/2441

USPC .......................................................... 370/235
See application file for complete search history.

(56) References Cited

U.S. PATENT DOCUMENTS

| | | | | |
|---|---|---|---|---|
| 9,755,978 | B1 * | 9/2017 | Mogul | H04L 47/2441 |
| 9,912,665 | B2 * | 3/2018 | Pope | H04L 63/10 |
| 2006/0067349 | A1 * | 3/2006 | Ronciak | H04L 47/125 |
| | | | | 370/412 |
| 2014/0286438 | A1 * | 9/2014 | Apte | H04N 21/2343 |
| | | | | 375/240.26 |
| 2015/0071076 | A1 * | 3/2015 | Izhak-Ratzin | H04L 47/805 |
| | | | | 370/236 |
| 2015/0172169 | A1 * | 6/2015 | DeCusatis | H04L 45/14 |
| | | | | 718/1 |

(Continued)

*Primary Examiner* — Faisal Choudhury
(74) *Attorney, Agent, or Firm* — Law Office of R. Alan Burnett, P.S

(57) ABSTRACT

Methods and apparatus for facilitating efficient Quality of Service (QoS) support for software-based packet processing by offloading QoS rate-limiting to NIC hardware. Software-based packet processing is performed on packet flows received at a compute platform, such as a general purpose server, and/or packet flows generated by local applications running on the compute platform. The packet processing includes packet classification that associates packets with packet flows using flow IDs, and identifying a QoS class for the packet and packet flow. NIC Tx queues are dynamically configured or pre-configured to effect rate limiting for forwarding packets enqueued in the NIC Tx queues. New packet flows are detected, and mapping data is created to map flow IDs associated with flows to the NIC Tx queues used to forward the packets associated with the flows.

19 Claims, 13 Drawing Sheets

(56) References Cited

U.S. PATENT DOCUMENTS

2015/0326698 A1* 11/2015 Mogul .................... G06F 9/547
 709/217
2017/0329656 A1* 11/2017 Pope ........................ G06F 9/542

* cited by examiner

EFFICIENT QOS SUPPORT FOR SOFTWARE PACKET PROCESSING ON GENERAL PURPOSE SERVERS

BACKGROUND INFORMATION

Software-based network packet processing on commodity servers and Software Defined Networking (SDN) and Network Function Virtualization (NFV) promise better flexibility, manageability and scalability, thus gaining tremendous industry momentum in recent years. However, with the rapid growth of network bandwidth consumption, software is hard-pressed to keep pace with the speed and scale of packet processing workloads. As an example, Telecommunications (Telco) workloads require support of network Quality of Service (QoS) on millions of active concurrent flows. To achieve this QoS support, we need to: (1) perform flow classification based on an arbitrary portion of the packets (as input keys) and assign QoS priority to the flow; and (2) enforce a given transmission rate for flows that belong to a priority assigned to it by step 1.

Under current software processing approaches, such as supported by the open-source Data Plane Development Kit (DPDK), all of foregoing functionalities, including the rate-limiting action itself, are facilitated and implemented through software running on a commodity server. On one hand, the flow classification and QoS priority assignment can be done very efficiently with carefully designed software modules (both Longest Prefix Match (LPM) and Exact Match or even based on packet payload information for example). On the other hand, performing rate limiting related operations on each flow (including time stamping, rate limiting, leaky bucket, etc,) proves to be very difficult to scale using a software-based approach, since the associated rate-limiting operations consume significant amounts of CPU (Central Processing Unit) cycles.

Specifically, performing the rate limiting using software executing on a CPU has to use the CPU running clock to account for the time, which requires reading the CPU cycle count or the system time during each loop to calculate the running time to release packets when appropriate (e.g., using a leaky bucket algorithm). However, executing the cycle-count instruction (RdTSC) requires serializing instructions to guarantee that the out-of-order pipeline has completed and finished before reading the cycle count. As a result, a huge variance of the RdTSC can be seen, which can add significant overhead in terms of latency and throughput for the packet processing pipeline to the extent that the CPU might not be able to process certain network flows with very strict QoS requirements. The problem worsens with the increase of number of flows.

QoS rate-limiting is also performed today in switches and Network Interface Controllers (NICs); however this approach lacks the flexibility of packet classification in the CPU because of the limited number of flows or packet classification fields supported by hardware and the limited TCAM (ternary content-addressable memory) capacity, TCAM is generally very costly and power hungry, and thus, generally it can support a limited number of flows.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
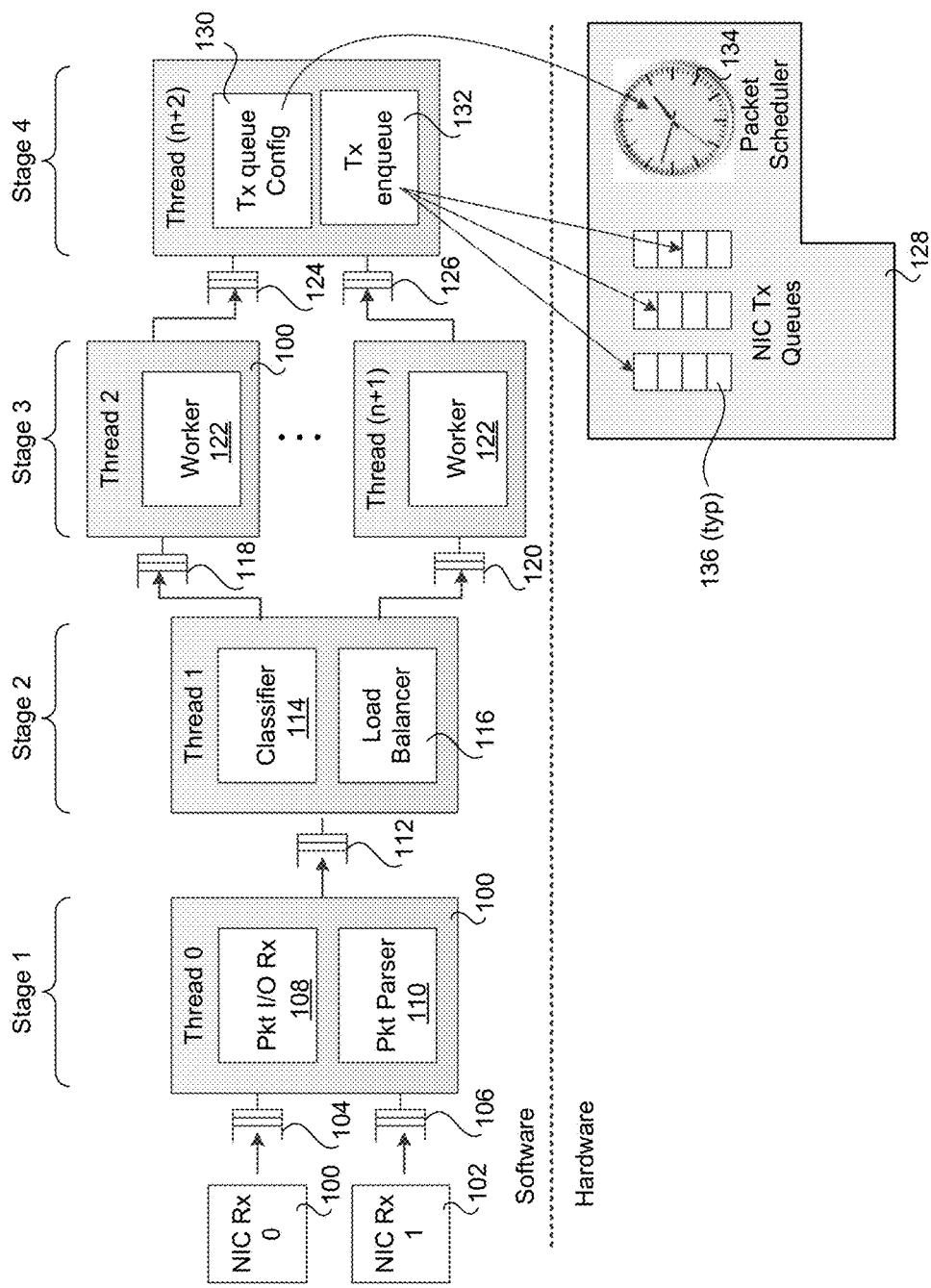
FIG. 1 is a schematic diagram illustrating an overview a hardware-assisted QoS framework to implement efficient rate-limiting in conjunction with software-based packet processing of packets received at a NIC, according to one embodiment.

Embodiments of methods and apparatus for facilitating efficient QoS support for software packet processing on compute platforms such as general purpose servers by offloading QoS rate limiting to NIC hardware are described herein. In the following description, numerous specific details are set forth to provide a thorough understanding of embodiments of the invention. One skilled in the relevant art will recognize, however, that the invention can be practiced without one or more of the specific details, or with other methods, components, materials, etc, In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc, is typically used for its disclosed function, implement, purpose, etc, In accordance with aspects of the embodiments disclosed herein, certain processing stages, such as rate-limiting operations to support QoS for software-based packet processing are offloaded to hardware-based facilities provided by a NIC, while other packet processing stages (e.g., flow classification and QoS priority level assignment) is maintained in software. By employing NIC-assisted software-based packet processing, more optimal performance of software-defined networking can be achieved using commodity servers. The various embodiments minimize the overhead associated with rate-limiting flows in a manner that leverages the CPU for performing packet classification while offloading the rate limiting stage to the NIC.

A fundamental building block of network QoS is the ability to do rate limiting on selected network traffic. For example, mobile carriers use "throttling" to limit data consumption, usually once a user's data usage exceeds a threshold, wherein the throttling of a flow between a source and a customer device is limited by rate-limiting the flow of packets associated with the flow. A given flow can be defined in any arbitrary way (e.g., combination of source and destination IP addresses, source and destination port number, and the Type of Service (ToS) byte of the IP header, etc,). Thus, rate limiting is simply composed of two stages, first a packet classification stage based on an arbitrary key or other classification technique, and second, enforcing a given transmission rate for packets matching these keys.

Today, the DPDK offers a flexible variable key-size and very efficient way of doing packet classification (e.g., using Cuckoo Hashing), by making use of a Single Instruction Multiple Data (SIMD) instruction and a bulk packet processing and matching. INTEL® has demonstrated that packet classification in INTEL® Architecture (IA) processors can be scaled to millions of flows and with a classification rate that is almost equivalent to specialized ASICs with TCAM.

However, rate limitation implementations in the CPU are not very efficient. The software code needs to depend on reading the CPU cycle count very often to get a notion of the running time, and based on the time window, elapsed packets are released for transmission. Executing the SIMD cycle-count instruction (RdTSC) reads the value of a CPU register, and although the overhead for this operation is not very high, there is no guarantee of its order of execution in the out-of-order execution window. Generally some serializing instructions need to be used to guarantee that all instructions in the pipeline have finished before reading the cycle count. As a result, a significant variance of the RdTSC may occur. As a result, the current implementation of rate-limiting enforcement in IA processors not only adds an overhead, but for some network applications requiring tight deadlines, the variance margin is too high to be acceptable.

FIG. 1 shows an overview of one embodiment of a hardware-assisted QoS framework to implement efficient rate-limiting that combines both the highly flexible optimized packet classification in IA with a low-overhead scheme for accurate rate limiting. The framework employs a packet pipeline including multiple stages that are implemented via execution of threads running on one or more processor cores, in one embodiment. Packets are received at NIC Rx (receive) ports 100 and 102 and are respectively buffered in NIC Rx queues 104 and 106. During a first packet processing stage, a first Thread 0 executes blocks of code on a processor core including a packet Input/Output (I/O) receive block 108 and a packet parser 110. In one embodiment, execution of packet I/O receive block 108 polls NIC Rx queues 104 and 106 and transfers packets into buffers in system memory (not shown) accessible to Thread 0 via execution of code in packet I/O receive block 108. As described below and illustrated in FIG. 2, in some embodiments a direct memory access (DMA) data transfer scheme is used. Under one embodiment, a pull scheme is used where code in packet I/O receive block pulls packets from NIC Rx queues 104 and 106 using a DMA data transfer. Alternatively, a push model can be used, where the packets are pushed from NIC queues 104 and 106 into memory buffers accessible to Thread 0.

Next, the packets are parsed by packet parser 110. As explained in further detail below, initial packet processing may be performed either through embedded logic on the NICs and/or software-based processing using a network stack. For example, in the case of Ethernet, layer 3 (e.g., Internet Protocol (IP)) or layer 4 (e.g., Transmission Control Protocol over IP (TCP/IP) or User Data Protocol (UDP)) packet content is embedded in a stream of Ethernet that are transferred between ports to effect network communication. When a stream of Ethernet frames are received at an NIC Rx port, they are de-framed to extract layer 2 Ethernet packets (also referred to as MAC layer packets) that are further processed to extract the embedded layer 3 and layer 4 (if applicable) packet content. In the illustrated embodiment of FIG. 2, the input to packet parser 110 are TCP/IP packets. The output of packet parser 110 comprising parsed packet data is enqueued in a queue 112.

During a second stage, the parsed packet data in queue 112 is processed by a second Thread 1, which executes blocks of code on a processor core corresponding to a packet classifier 114 and a load balancer 116. Packet classifier 114 classifies the packet flow using information in the packet header using a conventional packet classification schemes, such as by calculating an n-tuple hash over a combination of packet header fields (e.g., source and destination IP addresses, source and destination port number, and the Type of Service (ToS) byte of an IP header). As described below, in one non-limiting embodiment a cuckoo hash scheme is implemented to facilitate packet classification. The result of flow classification returns a flow identifier (flow ID) for the packet. In one embodiment, the flow ID is added to a packet header field for packets that are received without an explicit flow ID, or, alternatively, a flow ID tag is attached to (e.g., prepended) or the packet is encapsulated in a "wrapper" that includes a field for the flow ID.

Load balancer 116 is used to balance distribution of downstream processing performed during stage 3 among n worker threads, depicted as worker Thread 2 and Thread (n+1), with ellipses to indicate there are also addition worker threads that are not shown for clarity). In one embodiment, load balancer 116 distributes classified packets by placing (e.g., via a pointer or the like or using a memory copy) classified packets in queues allocated for respective worker threads, as illustrated by queues 118 and 120 for worker Thread 2 and Thread (n+1).

As shown, each of worker Thread 2 through Thread (n+1) includes a worker code block 122. The worker code block is executed by each worker thread to perform one or more packet processing operations relating to any application-specific processing or service that is to be performed on a given packet or packet flow to which the packet belongs. Such application-specific processing operations include but are not limited to firewall operations, deep-packet inspection, malicious code detection, QoS-related operations. Example services may include NAT (Network Address Translation) services, firewall services, packet-processing services, WAN Optimization, Virtual Private Network Gateway, Video Transcoding, Content Distribution Network services, etc, For simplicity, each worker code block 122 is depicted as being executed by a respective thread; however, the operations performed by a worker code block may also be implemented via multiple threads using a service chain, where a given thread in the service chain passes operations to a next thread upon completion of its operations, and the cycle is repeated until all operations or services have been performed. It is further noted that based on the packet flow classification, different operations/services may be performed during packet processing of different flows.

Stages 1-3 correspond to conventional operations that are currently supported by software defined networking (SDN) libraries, such as libraries in the DPDK. As discussed above, under today's approach, rate-limiting is likewise implemented using a software-based approach, which would be implemented in stage 4. Conversely, under the embodiments herein, stage 4 of the packet-pipeline is changed to a configuration and enqueuer stage. Based on network QoS policy, the classification table (or flow table that includes classification data) is constructed to include rate limiter parameters for respective QoS classes, similar to the conventional approach implemented for stage 4. However, instead of enforcing the rate limit in the CPU, the parameters are programmed in the NIC Tx queues. Thus, stage 4 is only responsible for enqueuing the packets to the correct NIC Tx queue and the NIC will enforce the rate in hardware, hence, a high-accuracy with very little overhead rate limitation can be achieved.

Returning to FIG. 1, upon completion of stage 3 processing, the processed packets are forwarded to respective transmit (Tx) queues in system memory, as depicted by queues 124 and 126. At the point, the processed packets in the Tx queues are ready to be transmitted outbound to a network via a NIC 128, which is implemented by the aforementioned configuration and enqueuing operations that are performed during stage 4. The configuration and enqueuing operations are respectively facilitated by execution of code corresponding to a configuration code block 130 and a transmit enqueue code block 132 by Thread (n+2). In one embodiment, each processed packet is directly or indirectly marked with a QoS parameter corresponding to the QoS class for the packet. A non-limiting example of a processed packet that is directly marked with a QoS parameter would include a QoS header field containing the parameter or similar QoS class indicia. As a non-limiting example of a processed packet being indirectly marked, a corresponding QoS parameter could be retrieved by performing a lookup of the flow ID for the packet in a flow table that contains QoS parameters for associated flows.

In one embodiment, configuration code block 130 examines the QoS parameter (e.g., either through inspection of the processed packet header or via a flow table lookup), and configures a packet scheduler 134 on NIC 128. Transmit enqueue code block 132 is used to forward the processed packets from the Tx queues 124 and 126 in system memory to NIC Tx queues 136 on NIC 128. The packet scheduler is used to schedule transmitting packets outbound from NIC Tx queues 136. It is also configured to support rate-limiting using the NIC hardware (e.g., through embedded logic on NIC 128). Code in the configuration code block 130 and transmit enqueue code block 132 work together to coordinate the queue settings configured for packet scheduler 134 and the corresponding NIC transmit queues that packet flows are enqueued in. In one embodiment, processed packets are forwarded from queues 124 and 126 (in system memory) to NIC Tx queues 136 using a DMA data transfer, examples of which are illustrated in figures described below.

Figure 1A:
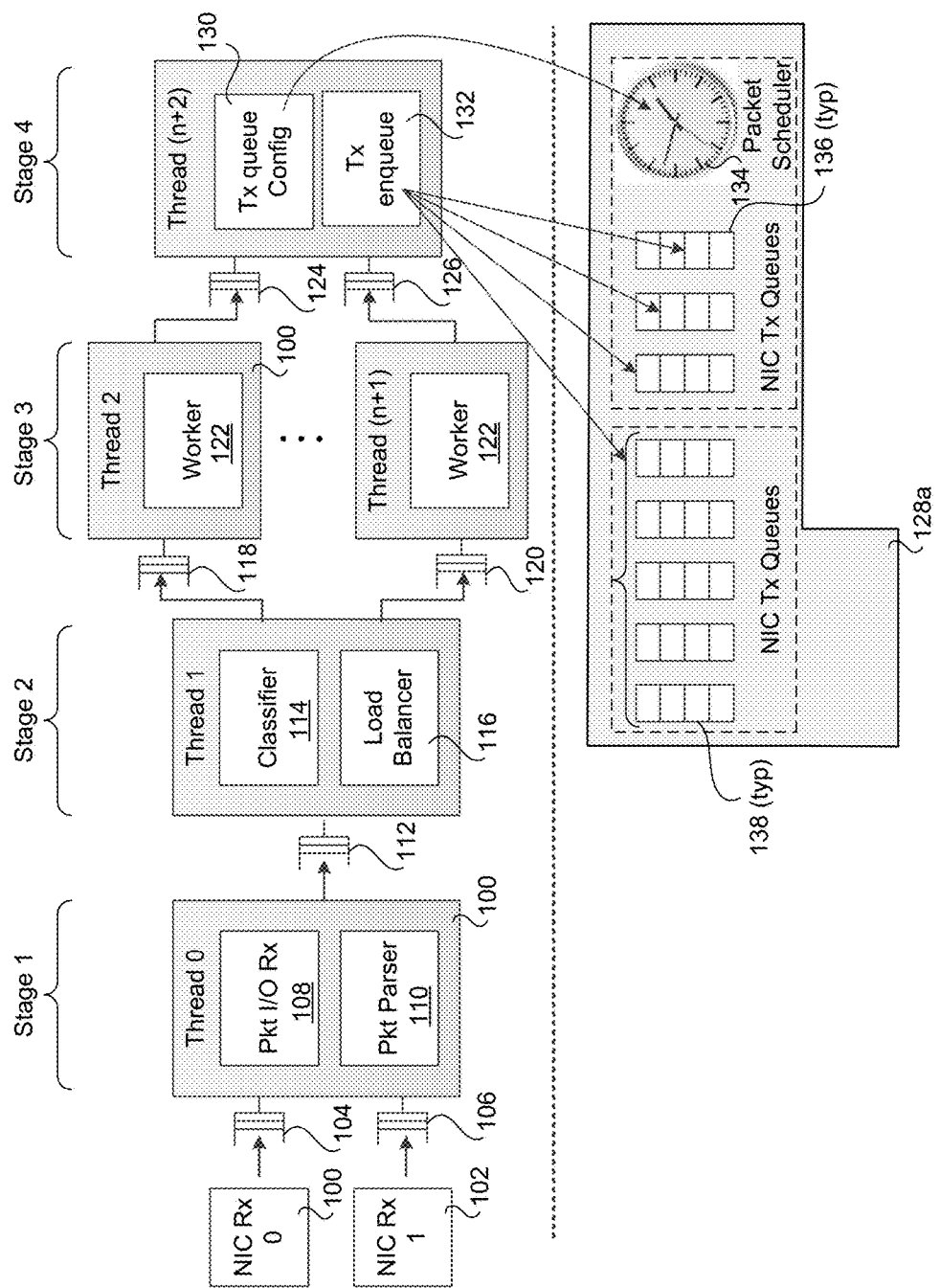
FIG. 1a is schematic diagram illustrating an alternative configuration of the NIC of FIG. 1 that includes both configurable rate-limited Tx queues and non-rate-limited Tx queues.

Under an alternative implementation, various queues of Tx queues 136 are configured to perform rate limiting at a predetermined rate in advance. Accordingly, rather than dynamically reconfiguring parameters for effecting rate limiting of a particular queue, the Tx queue to which a packet is forwarded is based on the rate to be used for the packet flow based on its QoS parameter. For example, a first portion of one or more queues could be configured to support a rate limit for a first QoS class 0, a second portion of one or more queues could be configured to support a second rate limit for a second QoS class 1, etc, Generally, most packet flows will not subject to rate limiting, but rather will be forwarded in a non-rate-limited manner. Accordingly, under some embodiments a portion of the NIC Tx queues do not support hardware-based rate-limiting, while another portion of the NIC Tx queues support hardware-based rate limiting. For example, FIG. 1a shows an alternative configuration of a NIC 128 that includes two types of NIC Tx queues. NIC Tx queues 136 may be configured by packet scheduler 134 to effect rate-limiting, while NIC Tx queues 138 are conventional NIC Tx queues that are not controlled by packet scheduler 134 (or otherwise have a scheduling mechanism that does not employ rate-limiting). In accordance with the embodiment shown in FIG. 1a, packets that are marked with a QoS parameter that indicates the packet is to be rate-limited are forwarded to one of NIC Tx queues 136, while packets marked with a QoS parameter that indicates the packet is not rate limited are forwarded to one of NIC Tx queues 138.

In one embodiment the NIC employs a controller chip that provides a Transmit Rate Scheduler (TRS) per Tx queue in hardware, where the transmission rate can be programmatically controlled for each queue (e.g., by a NIC driver or the like) A non-limiting example of such a controller chip is an INTEL® 82599 10 GbE Ethernet controller.

The software-based processing depicted in FIGS. 1 and 1a may be implemented using various types of software configurations, including in an application space of an operating system running on platform hardware and various virtual machine (VM)-based architectures. In one embodiment, the software code for implementing the operations includes DPDK libraries that are configured to be implemented using the applicable software architecture chosen for the particular implementation. Details of the DPDK architecture are discussed below with reference to FIG. 6.

Figure 2:
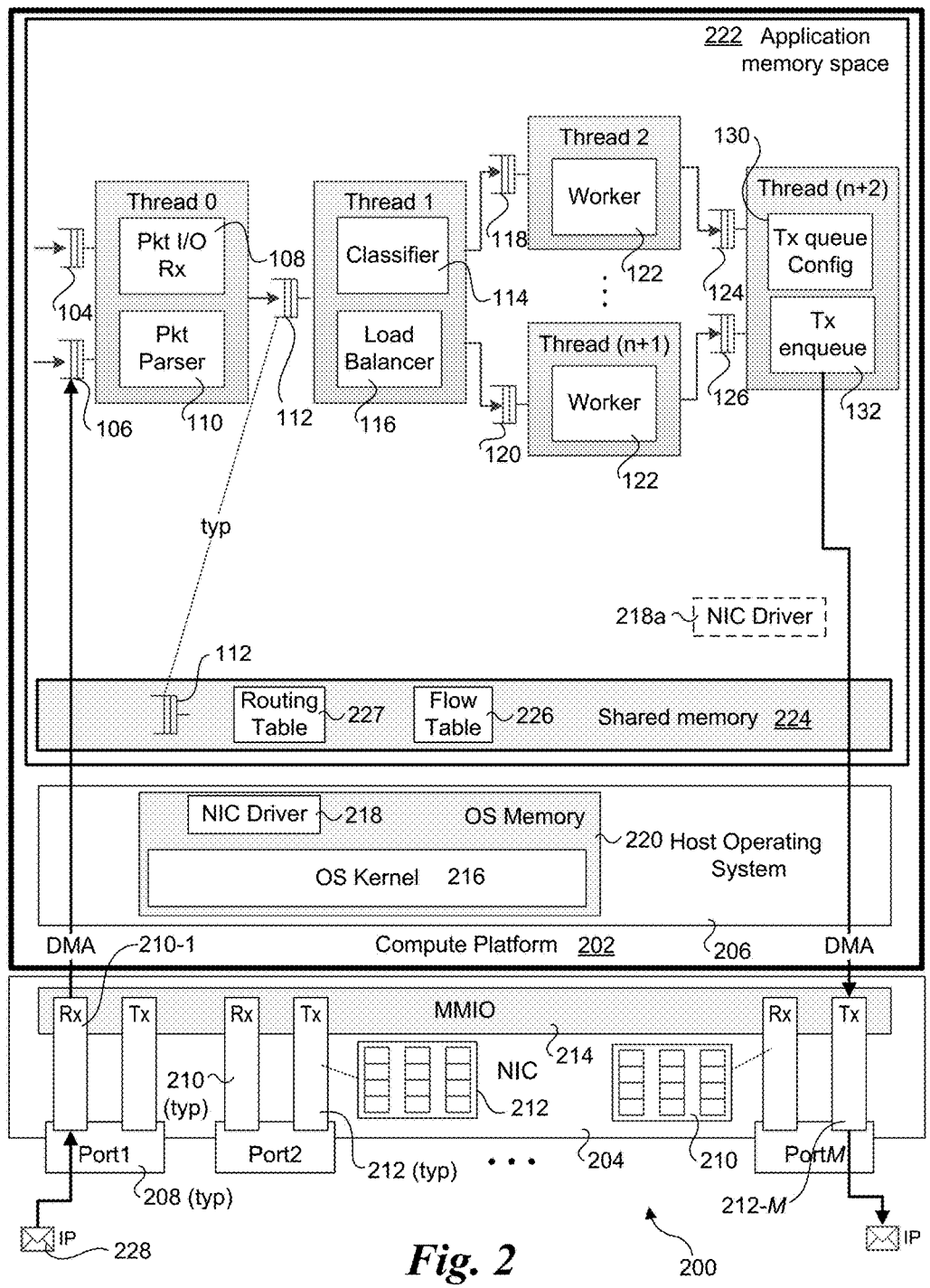
FIG. 2 is a schematic diagram illustrated a packet processing flow on a compute platform employing software-based packet processing and hardware assisted rate-limiting, according to one embodiment.

FIG. 2 shows an implementation architecture 200 for a compute platform 202 including a NIC 204 and running a host operating system (OS) 206. NIC 204 includes M ports 208 (labeled Port1, Port2 . . . PortM), each including a set of receive queues 210 and transmit queues 212. NIC 212 further includes on-board memory that is configured as Memory-Mapped Input-Output (MMIO) 214. In addition to the queues shown, NIC 204 may include addition buffers, such as input buffers and/or output buffers at each port 208 (not shown for clarity). Also, the compute platform may include multiple NICs that operate in a similar manner to that described for NIC 212.

Host OS 206 includes an OS kernel 216 and a NIC driver 218 in OS memory 220, and runs user-level applications in an application memory space 222 using virtual memory mapping between the application memory space and system memory in compute platform 202. As an option, all or a portion of the NIC driver functionality may be implemented in application memory space 222, as depicted by a NIC driver 218a.

As illustrated in FIG. 2, each of the code blocks of FIGS. 1 and 1a are implemented in application memory space 222. In addition, various data structures are maintained in shared memory 224. For example, in one embodiment a flow table 226 is employed to facilitate packet classification operations, and supports concurrent access (both read and write). In addition, in one embodiment a routing table 227 containing routing and/or forwarding packets (referred to herein as the forwarding NIC and port, or if only a single NIC is used, the forwarding port). Determination of the forwarding NIC and port is a well-known operation and generally involves a lookup in a routing table (also sometimes referred to as a forwarding table) using a destination address for the packet, such as a destination MAC (DMAC) address or a destination IP address, depending on whether layer 2 or layer 3 routing is being implemented for the next hop for the packet.

Another use a shared memory 224 is for passing data between threads. Rather than forward the data between a pair of separate buffers, such as via a memory copy operation from one buffer to the other, the data (to be passed) is stored in shared data structure such as a buffer or queue in shared memory 224, with the threads between which the data is to be passed having shared access to the data structure. To support concurrency and to prevent deadlocks, one or more well-known thread concurrency mechanisms may be implemented. For example, in one embodiment semaphores are used, wherein only a thread that currently holds the write semaphore can write to the data structure (e.g., insert, update, or delete for an entry in a table data structure or update, append or remove an entry in a queue). Generally, multiple threads may perform concurrent read access, although mechanisms to ensure the read data is not stale may be implemented.

As shown by example in FIG. 2, queue 112 is depicted in shared memory 224. In a similar manner, one or more of queues 104, 106, 118, 120, 124, and 126 may be implemented in shared memory 224.

Figure 3A:
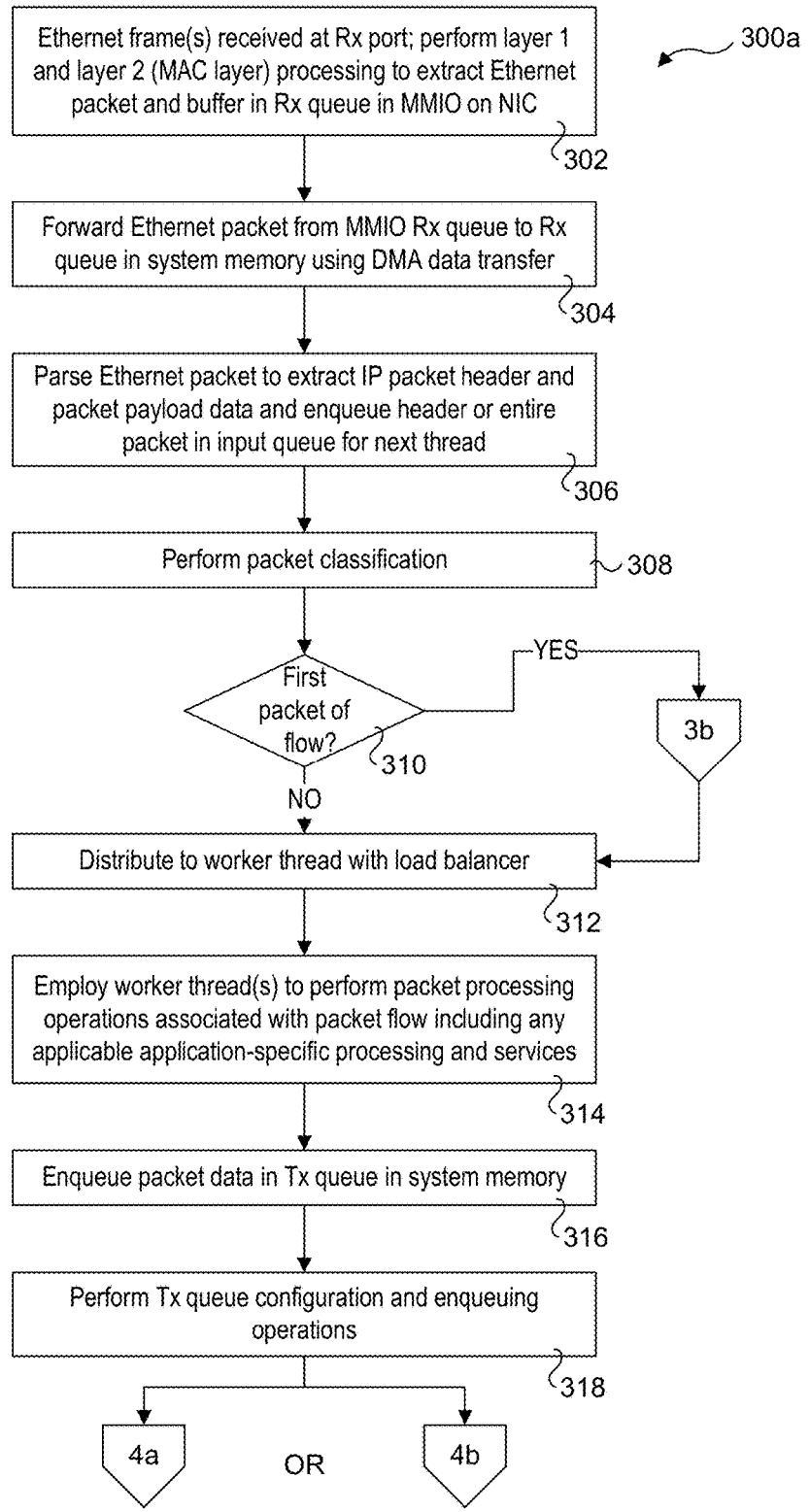
FIGS. 3a and 3b are flowchart diagrams illustrating respective portions of a flowchart illustrating operations and logic performed during software-based packet processing operations of embodiments described herein, according to one embodiment.
Figure 3B:
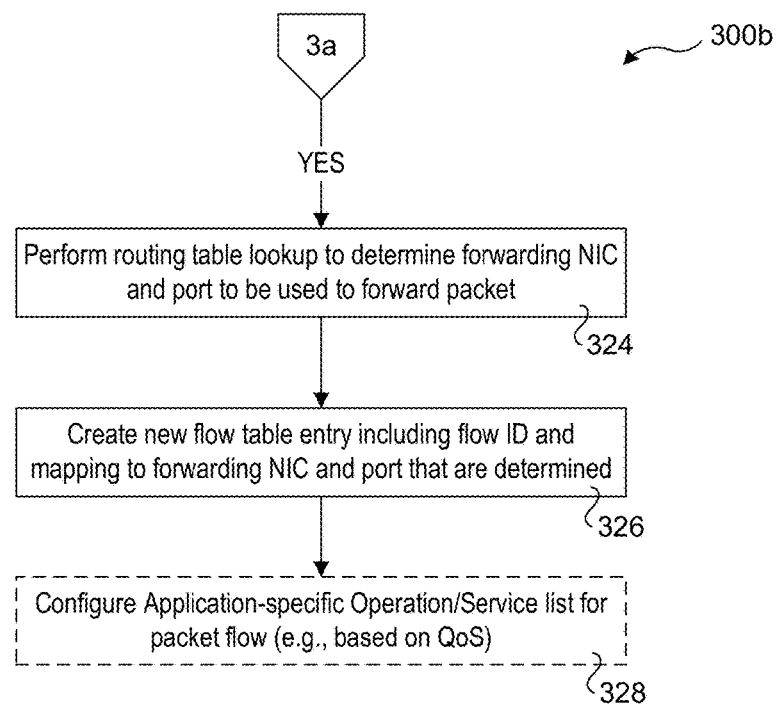

FIGS. 3a and 3b show respective flowcharts 300a and 300b illustrating operations and logic for implementing one embodiment of an IP packet processing flow using platform architecture 200. First, in a block 302 one or more Ethernet frames containing an IP packet 228 is received at an Rx port of Port1, and layer 1 and layer 2 processing is done on NIC 204 to extract an Ethernet packet that is buffered in an Rx queue 210-1 in MMIO 214. Using either a push or pull model, execution of packet I/O receive block by Thread 0 results in the Ethernet packet being forwarded to Rx queue 106 using a DMA transfer, as depicted in a block 304.

Next, in a block 306, the Ethernet packet is then parsed to extract the packet header and payload data for IP packet 228, which is then enqueued in queue 112 which is the input queue for Thread 1. For example, for a circular FIFO queue data structure, the packet header may be inserted into the queue using a tail pointer. It is further noted that depending on what processing is to be done on a packet, the packet header and packet payload may be stored in separate data structures using information that links the packet with the header. For example, since packet headers for a given packet type have a have predetermined size, a FIFO queue can be configured to include multiple entries having a fixed size that includes a field for a pointer to a corresponding object in memory in which the packet payload data for the packet is stored.

The operations in blocks 308 and 310 are performed by Thread 1. In block 308, packet classification operations are performed via execution of classifier 108. Generally, a myriad of different packet classification schemes may be implemented using well-known techniques. Under a typical packet classification scheme, a flow table is configured with key values (the flow IDs) that are used to identify flows and associated parameters for those flows. Optionally, some packet classification schemes may employ other types of data structures including more than one table, such as employed by Cuckoo hashing. Under this approach, the flow lookup table includes a match field that contains either a specific value that corresponds to a parameter of the packet, or a value that indicates the flow entry is not included in a particular flow's parameter set. Each hash table row, or "bucket," may include one or more key/value pair, wherein the key identifies some item of data (e.g., a network packet flow identifier) and the value provides a location of the data (e.g., the flow data corresponding to the network packet flow identifier) in another location, such as another table, or the value may identify a network port via which the packet is to be forwarded. For example, if a hash table is a four-way association table, one bucket can support four key/value pair entries. Additionally, each key may be mapped to more than one bucket. For example, an array of hash functions may be provided such that different buckets can be mapped to a key based on which hash function was applied to the key.

As part of the packet classification operations, a determination is made in a decision block 310 to whether the packet is a first packet in a new flow that has yet to be classified. If the packet is the first packet of a new flow, the answer to decision block 310 is YES, and the flowchart logic flows to the start of flowchart 300b of FIG. 3b.

In a block 324 a routing table lookup is performed to determine what NIC and port on the NIC are to be used to forward the packet (i.e., the forwarding NIC and port, or if the platform only includes a single NIC, the forwarding port). The routing table lookup will generally use either the DMAC address or destination IP address as the lookup value, depending on whether routing from the NICs uses layer 2 or layer 3 routing.

In a block 326 a new flow table entry is created including a flow ID for the flow and information mapping the entry to the forwarding NIC and port determined in block 324. For example, the flow ID may be derived by performing a hash on fields in the packet header or using other well-known techniques. It is further noted that as used herein, a flow table may comprise a single table containing the relevant data relating to a flow, such as having a single record including a set of data relating to a given flow, or the flow table may include both a table containing key/value entries, where data in a value may point to a data structure that is separate from the flow table containing additional information relating to the packet flow.

In an optional block 328, an application-specific list of operations and/or services to be performed by packets in the packet flow is configured. Optionally, similar information based on the QoS class for the first packet may be configured, either dynamically when the first packet is being processed or pre-configured. After completion of the operations of flowchart 300b, the logic returns to block 312 of flowchart 300a.

After packet classification has been performed, load balancer code block 116 is executed by Thread 1, which distributes the next stage of processing to one of worker Thread 2 to Thread (n+1), as depicted in block 312. In one embodiment, a round-robin distribution scheme is used. In another embodiment, information identifying the current depth (number of entries) of the input queues for the worker threads are considered, with distribution of a given packet to a queue that has the least number of entries. In addition, load balancer also may distribute a packet to a worker thread based on application-specific operations to be performed on the packet, as discussed above. In one embodiment, the application-specific operations are identified by the QoS class for the packet or other indicia either specifically contained in the packet header or included in the flow table.

Next, in a block 314, one or more worker threads perform packet processing operations associated with the packet flow for the packet. For example, this may include application-specific processing for some packet flows, as discussed above. Also, as discussed above, the operations of block 314 may involve performance of multiple packet processing operations and/or services that may be implemented via execution of one or more worker threads either in a serial manner, such as using a service chain, or substantially in parallel. For example, operations/services that will change packet data will generally be done in a serial manner, while operations/services that do not change packet data may be done in parallel.

Upon completion of the packet processing for a given packet, in a block 316 the packet data is enqueued in one of the Tx queues in system memory accessible to Thread (n+2), such as depicted by Tx queues 124 and 126 in FIG. 2. In a manner similar to that discussed above, depending on the particular implementation scheme, this may involve enquiring an entire packet into a Tx queue, or just the packet header for the packet in the Tx queue.

The packet processing operations are completed in a block 316, wherein the NIC Tx queue configuration and enqueuing operations are performed by execution of configuration code block 130 and a transmit enqueue code block 132 by Thread (n+2). Further details of the operations of block 316 under alternative embodiments are shown in flowcharts 400a and 400b of FIGS. 4a and 4b.

Figure 4A:
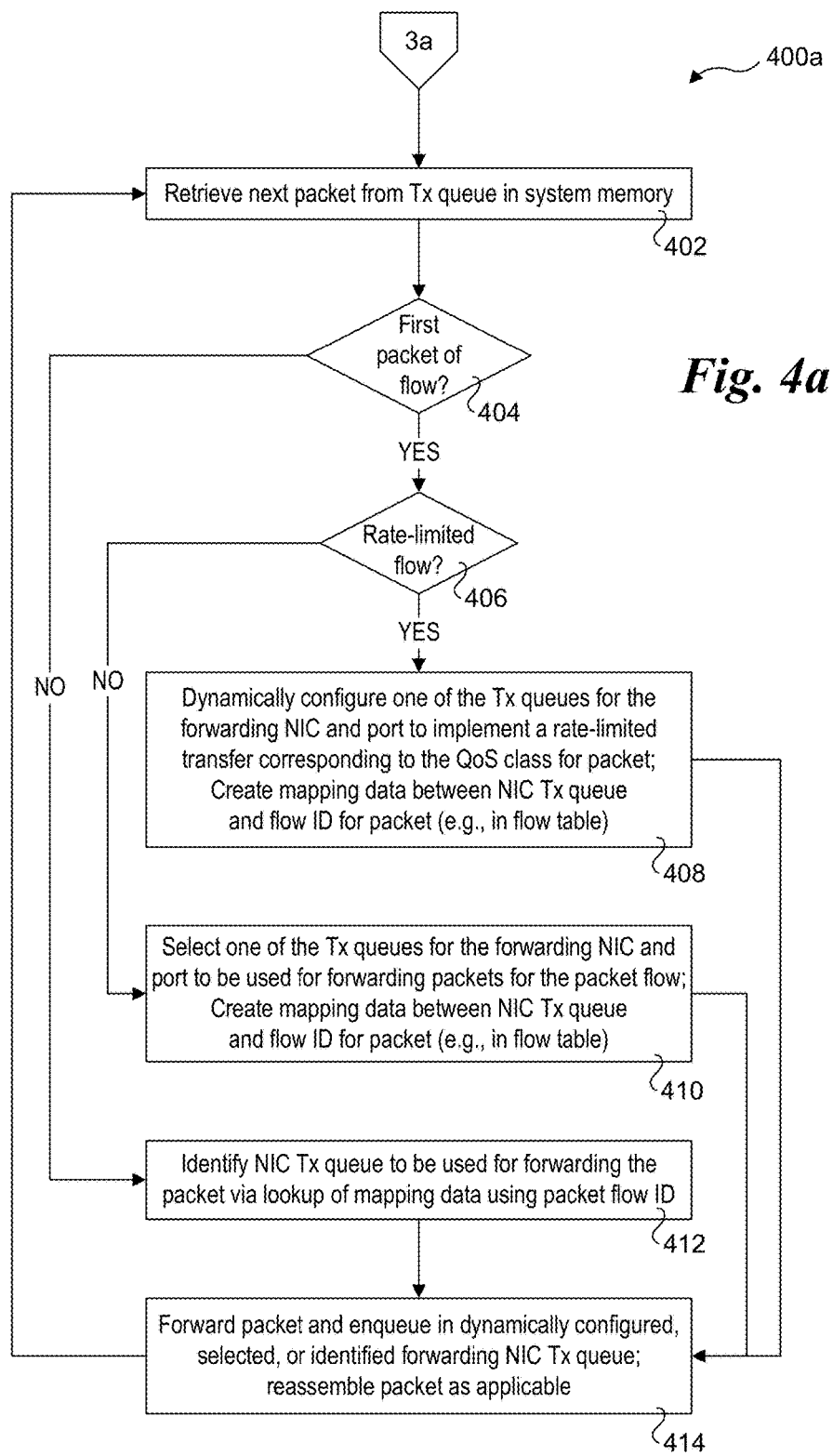
FIG. 4a is a flowchart illustrating operations and logic performed during software-based packet processing operations to dynamically configure NIC Tx queues to effect rate-limiting, according to one embodiment.

FIG. 4a illustrates Tx queue configuration and enqueuing operations of block 318 using a dynamic configuration scheme, according to one embodiment. As indicated by the loops, the operations are performed on an ongoing basis. In a block 402 the next packet (e.g., the packet pointed to by a head pointer for a circular FIFO queue) in a Tx queue in system memory is retrieved. As above, this may involve retrieving an entire packet, or just the packet header.

In decision blocks 404 and 406, respective determinations are made to whether the packet is the first packet in a new flow and, if it is, whether the flow is a rate-limited flow (i.e., a flow for which rate-limiting is to be applied). For example, various well-known schemes may be employed to mark a packet as the first packet in a flow or otherwise identify a first packet in a flow.

If the packet is the first packet in a rate-limited flow, the answer to decision both decision blocks 404 and 406 is YES and the logic flows to a block 408 in which a Tx queue associated with the forwarding NIC and port to be used for forwarding packets for the flow (e.g., as determined in block 326) is dynamically configured to implemented the rate-limit for the packet flow based on the QoS class (or otherwise identified using a QoS parameter). In addition, a new mapping is created (or an existing mapping is updated) between the Tx queue and the flow ID for the packet, such as by updating the parameters associated with the flow ID in the flow table. The logic then proceeds to a block 414 in which the packet is forwarded and enqueued in the dynamically configured forwarding NIC Tx queue, reassembling the packet if applicable. In cases where the packet header and packet payload data have been separated, the packet may be reassembled before being forwarded to the NIC Tx queue. As illustrated in FIG. 2, under one embodiment a copy of the packet is forwarded to a Tx queue 212-M using a DMA data transfer.

In some embodiments, all first packets are flows are processed as if their associated flows are rate-limited, with the default rate-limit being unlimited (or otherwise the QoS for such packets indicate that rate-limiting is not to be applied. In other embodiments, first packets of packet flows for which rate-limits are not to be applied are processed separately. This situation is illustrated in flowchart 400a, where the answer to decision block 404 is YES, while the answer to decision block 406 is NO.

This results in the flow logic proceeding to a block 410 in which one of the Tx queues associated with the forwarding NIC and port for the packet flow is selected to be used for forwarding packets for the packet flow. As was done in block 408, a new mapping is created (or an existing mapping is updated) between the Tx queue and the flow ID for the packet, such as by updating the parameters associated with the flow ID in the flow table. The logic then proceeds to block 414 in which the packet is forwarded and enqueued in the forwarding NIC Tx queue that is selected, reassembling the packet if applicable.

If the packet is not the first packet of a new packet flow, the answer to decision block 404 is NO, and the logic flows to a block 412 in which the Tx queue on the forwarding NIC is identified via a lookup of the mapping data using the packet flow ID. For example, an entry corresponding to the flow ID in a forwarding table can be looked up in this manner, and the corresponding forwarding NIC and Tx queue to be used for packets with that flow ID can be identified. The logic then proceeds to block 414 in which the packet is forwarded and enqueued in the identified forwarding NIC Tx queue, reassembling the packet if applicable.

Figure 4B:
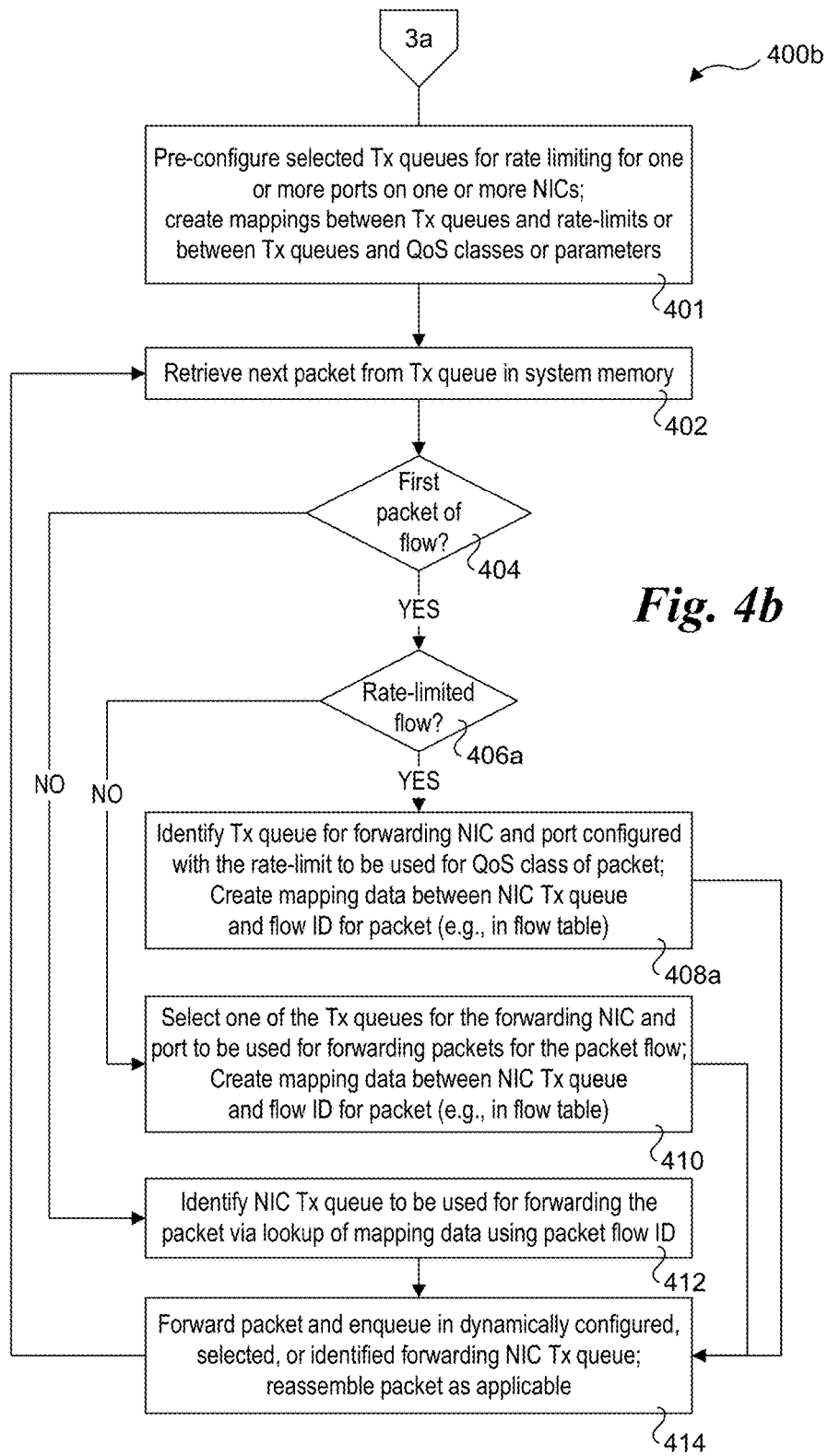
FIG. 4b is a flowchart illustrating operations and logic performed during software-based packet processing operations under which NIC Tx queues are pre-configured to effect pre-determined rate-limiting, according to one embodiment.

FIG. 4b illustrates Tx queue configuration and enqueuing operations of block 318 using a pre-configuration scheme, according to one embodiment. In a block 401, selected Tx queues for one or more ports on one or more NICs are pre-configured to effect rate limiting for packets that are transmitted via those Tx queues. Mappings are then created between these Tx queues and rate-limits or between the Tx queues and QoS classes or corresponding QoS parameters used for the QoS classis. For example, the mappings may be implemented in a table that includes a Tx queue column that includes indicia used to identify a particular Tx queue and a rate-limit column. Optionally, such a table structure could include additional columns identifying the port and NIC associated with the Tx queue.

After the Tx queues have been pre-configured, the remaining operations are performed on an ongoing basis. The operations of block 402, 410, 412, and 414, and decision block 404, are the same as those shown in flowchart 400a of FIG. 4a. In addition to the pre-configuration operations in block 401, the other differences in flowchart 400b (when compared to flowchart 400a) are in a decision block 406a and a block 408a.

If the packet is a first packet of a rate-limited flow, the result of each of decision blocks 404 and 406a is YES, and the logic flows to block 408a in which a Tx queue associated with the forwarding NIC and port that has been configured with a rate-limit used for the QoS class for the packet is identified. If there are multiple Tx queues that meet this criteria, then a Tx queue with the lowest fill level is selected under one embodiment. In another embodiment, a Tx queue from among the multiple Tx queues meeting the rate-limit is selected using a round-robin approach. As with block 408, a new mapping is created (or an existing mapping is updated) between the Tx queue that is identified and the flow ID for the packet, such as by updating the parameters associated with the flow ID in the flow table. The logic then flows to block 412 in which the packet is forwarded and enqueued in the Tx queue that is identified in block 408a.

Figure 1B:
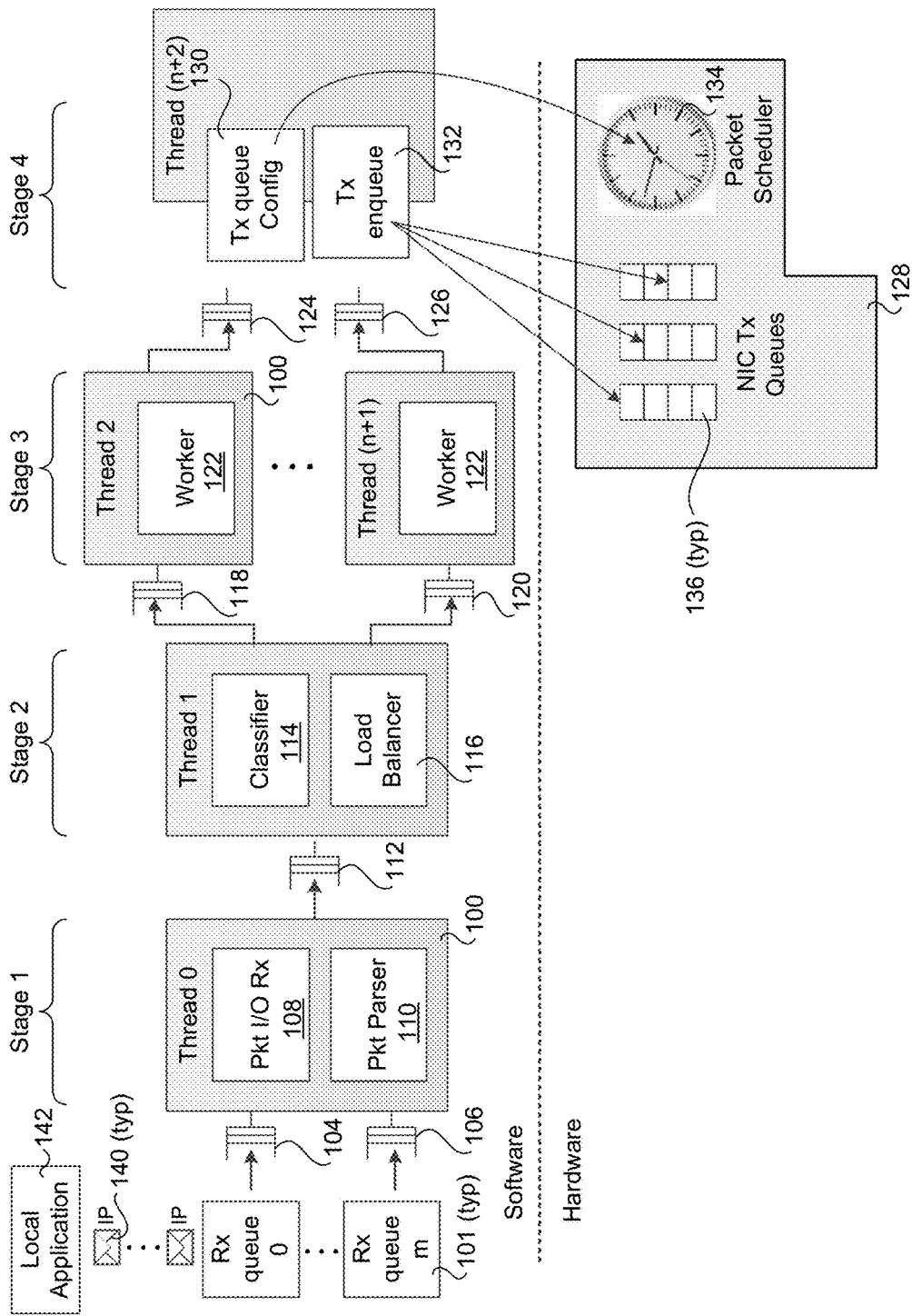
FIG. 1b is a schematic diagram illustrating an overview a hardware-assisted QoS framework to implement efficient rate-limiting in conjunction with software-based packet processing for packets generated by a local application, according to one embodiment.

As shown in FIG. 1b, in addition to processing packets received at a NIC, packets that are generated internally may also be processed using the same processing pipeline (e.g., stages 1-4 of FIGS. 1 and 1a). Under this approach, packets 140 that are generated on the host platform by a local application 142 are placed in Rx queues 101. Subsequently, packets in Rx queues 101 are processed using software-based processing in a manner similar to packets received at NICs described herein.

Figure 5A:
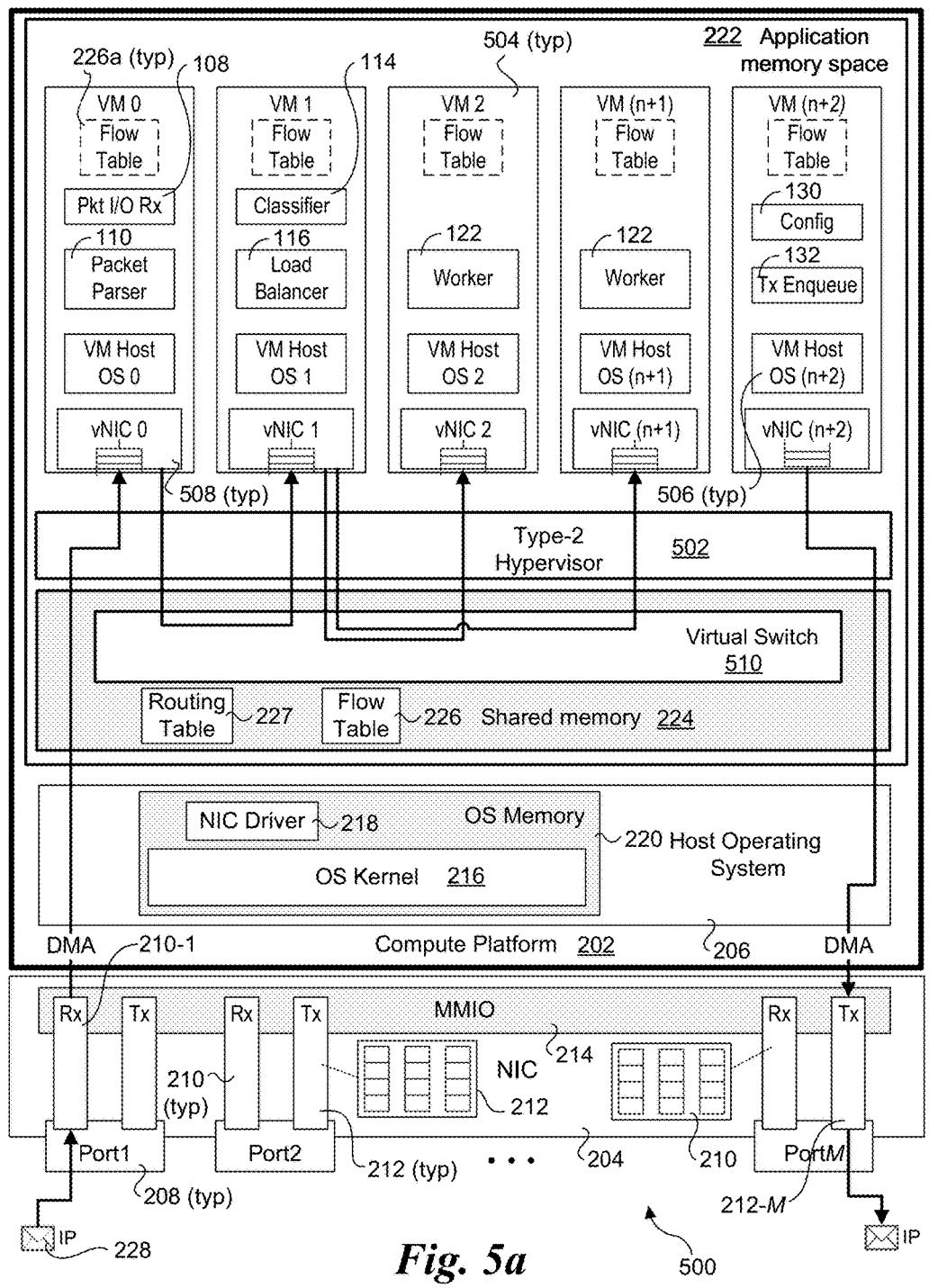
FIGS. 5a and 5b illustrates a compute platform architecture configured to support aspects of the software-based packet-processing operations described herein under which packet processing is facilitated through use of a plurality of virtual machines running on a host operating system and a Type-2 hypervisor.
Figure 5B:
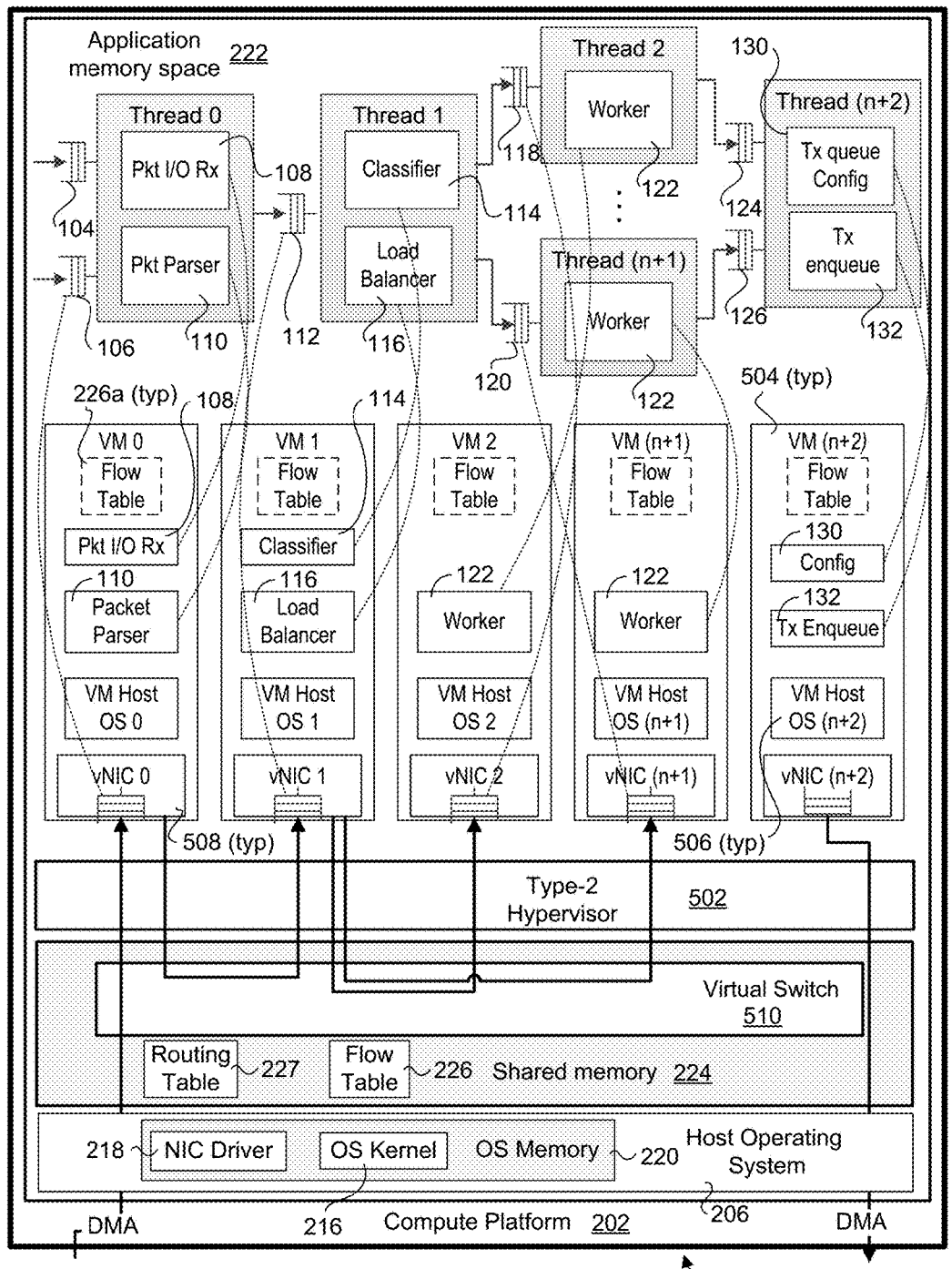

As discussed above, the software-based processing depicted in FIGS. 1 and 1a may be implemented using various virtual machine (VM)-based architectures. For example, FIGS. 5a and 5b show a platform architecture 500 corresponding to one embodiment of a Type-2 hypervisor-based implementation. A Type-2 hypervisor runs as a user application in application memory space 222, as depicted by Type-2 hypervisor 502, and is used to provide an abstraction and configuration layer between a n+3 virtual machines 504 and host operating system 206, which are also labeled VM 0, VM 1, VM 2, VM (n+1) VM (n+2). Each VM 504 runs a VM host operating system 506 and includes a virtual NIC (vNIC) 508. A virtual switch 510 is implemented in shared memory 224 along with a flow table 226. Each of VMs 504 is further depicted as including a flow table 226a in dashed outline, which is used to indicate that code running on the VMs have access to flow table 226.

A routing table 227 is also shown in shared memory 224. Although not depicted separately in any of the VMs 504, code running in one or more of the VMs, such as the code for classifier 114, is enabled to perform routing table lookups in the manner described herein.

As further shown in FIG. 5b, a respective Thread 0, 1, 2, (n+1), and (n+2) executes its corresponding code blocks on VM 0, VM 1, VM 2, VM (n+1) . . . VM (n+2). It will be recognized that the 1:1 relationship of threads and VMs is merely exemplary, as a given VM may be configured to run multiple of Threads 0–(n+2).

Figure 5C:
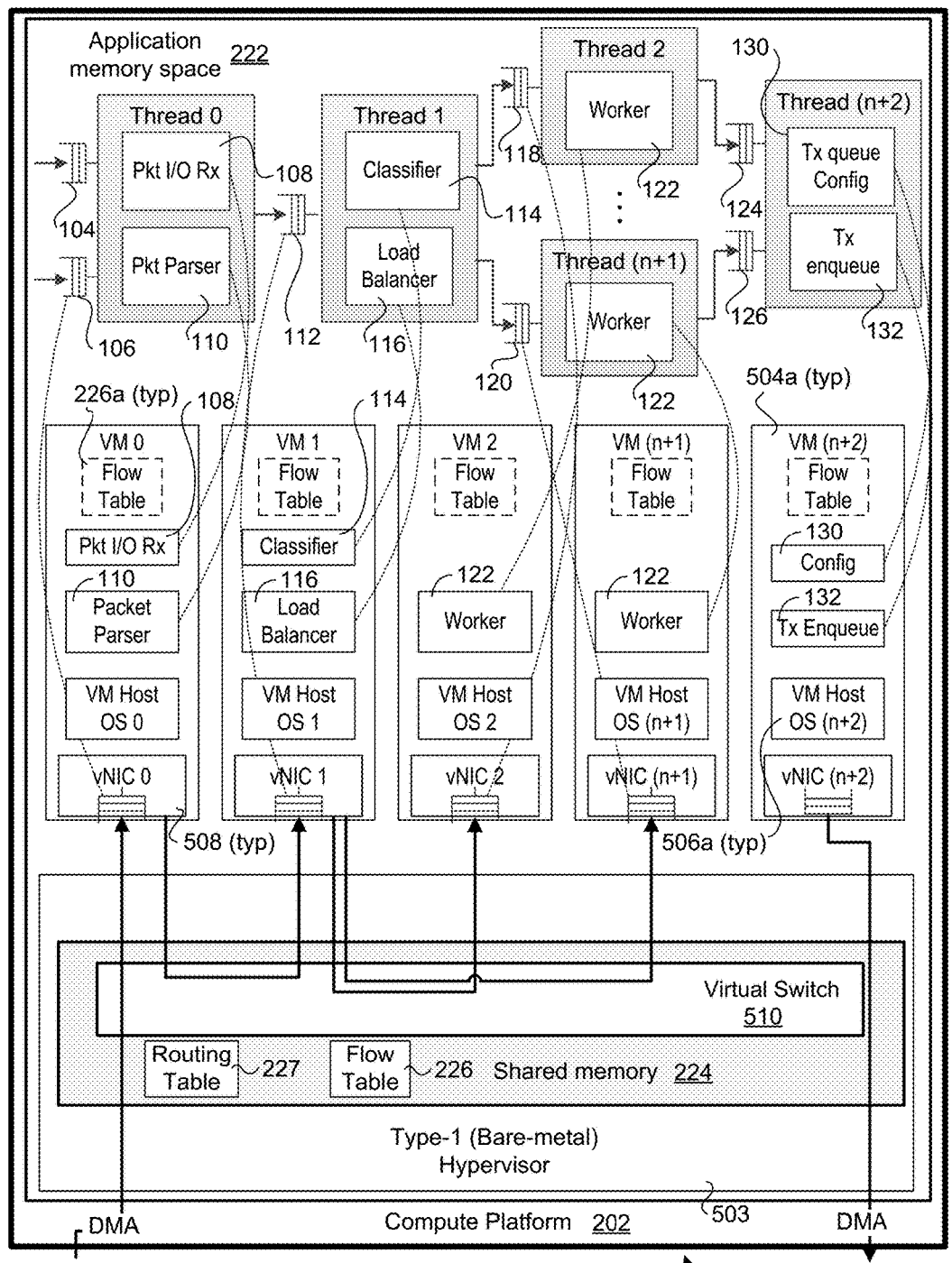
FIG. 5c illustrates a variation of the compute platform architecture of FIGS. 5a and 5b, wherein a Type-1 hypervisor is used rather than a Type-2 hypervisor.

FIG. 5c shows an alternative VM-based implementation included in a platform architecture 500a that employs a Type-1 hypervisor 503 rather than a Type-2 hypervisor. One of the primary difference between a Type-1 hypervisor and a Type-2 hypervisor is that the VMs are not run on a host operating system under the former, but rather run directly on the platform hardware. Hence, a Type-1 hypervisor is also referred to as a "bare-metal" hypervisor. Generally, the VMs and VM host operating systems employed for a Type-1 hypervisor are slightly different than VMs and VM host operating systems, having been modified to work with a Type-1 hypervisor. Accordingly, the VMs in FIG. 5c are depicted as VMs 504a, while the VM host operating systems are depicted as VM Host OS 506a.

As discussed above, in some embodiments, code from the DPDK libraries are used to perform aspects of the software-based packet processing operations described herein. In order to better take advantage of the architecture of commodity servers and similar platforms running x86-based processors, INTEL® Corporation original developed the DPDK (which is now open source), which is a set of libraries optimized for NIC drivers designed for high-speed packet-processing on x86 platforms. DPDK places devices drivers, which are commonly part of an operating system (OS) kernel, in user-space to allow zero-copy packet processing without needing to modify the OS kernel. To enhance efficiency, it hands batches of packets to processing threads to be processed together.

Figure 6:
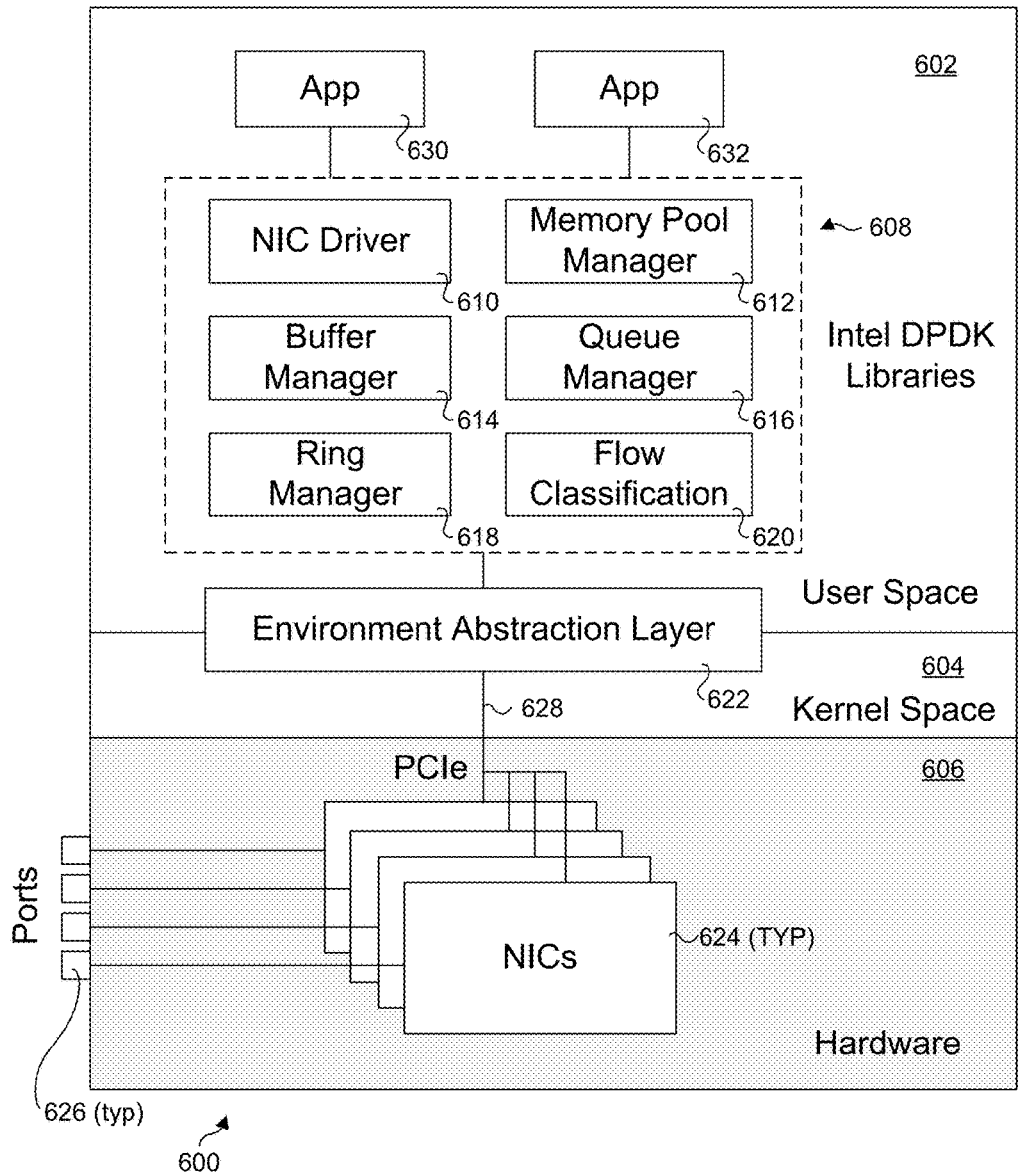
FIG. 6 is a schematic block diagram illustrating an architecture for an INTEL® Data Plane Development Kit (DPDK)

An illustration of a DPDK architecture 600 is shown in FIG. 6. As shown, DPDK architecture 600 includes a user space 602, a kernel space 604 and hardware 606. As stated above, the DPDK libraries 608 are implemented in user space 602, rather than kernel space 604. The DPDK libraries include NIC drivers 610, a memory pool manager 612, a buffer manager 614, a queue manager 616, a ring manager 618 and flow classification 620. These user space components are interfaced to hardware components in hardware 606 via an environment abstraction layer 622. In FIG. 6, the illustrated hardware components include multiple NICs 624, which are coupled to the network via ports 626. NICs 624 are also shown coupled to environmental abstraction layer 622 via PCIe interconnects 628; PCIe supports DMA (direct memory access) reads and writes using MMIO on the NICs, enabling packets to be transferred between buffers in user space 602 and NICs 624 without processor intervention.

Memory pool manager 612 is responsible for allocating pools of objects in memory. A pool is created in huge page memory space and uses a ring to store free objects. It also provides an alignment helper to ensure that objects are padded to spread them equally on all DRAM channels. Buffer Manager 614 reduces by a significant amount the time the operating system spends allocating and de-allocating buffers. The DPDK pre-allocates fixed size buffers which are stored in memory pools. Queue manager 616 implements safe lockless queues, instead of using spinlocks, which allow different software components to process packets, while avoiding unnecessary wait times.

Flow classification 620 provides an efficient mechanism that incorporates INTEL® Streaming SIMD Extensions (INTEL® SSE) to produce a hash-based on tuple information so that packets may be placed into flows quickly for processing, thus greatly improving throughput. NIC drivers 610 include includes poll mode drivers for 1 GbE and 10 GbE Ethernet controllers that are designed to work without asynchronous, interrupt-based signaling mechanisms, which greatly speeds up the packet pipeline.

During operation, applications 630 and 632 operate as packet consumers and producers, and are illustrated of various types of applications and services supported by the DPDK architecture. In addition, applications 630 and 632 may be illustrative of Network Function Virtualization (NFV) appliances and the like.

Figure 7:
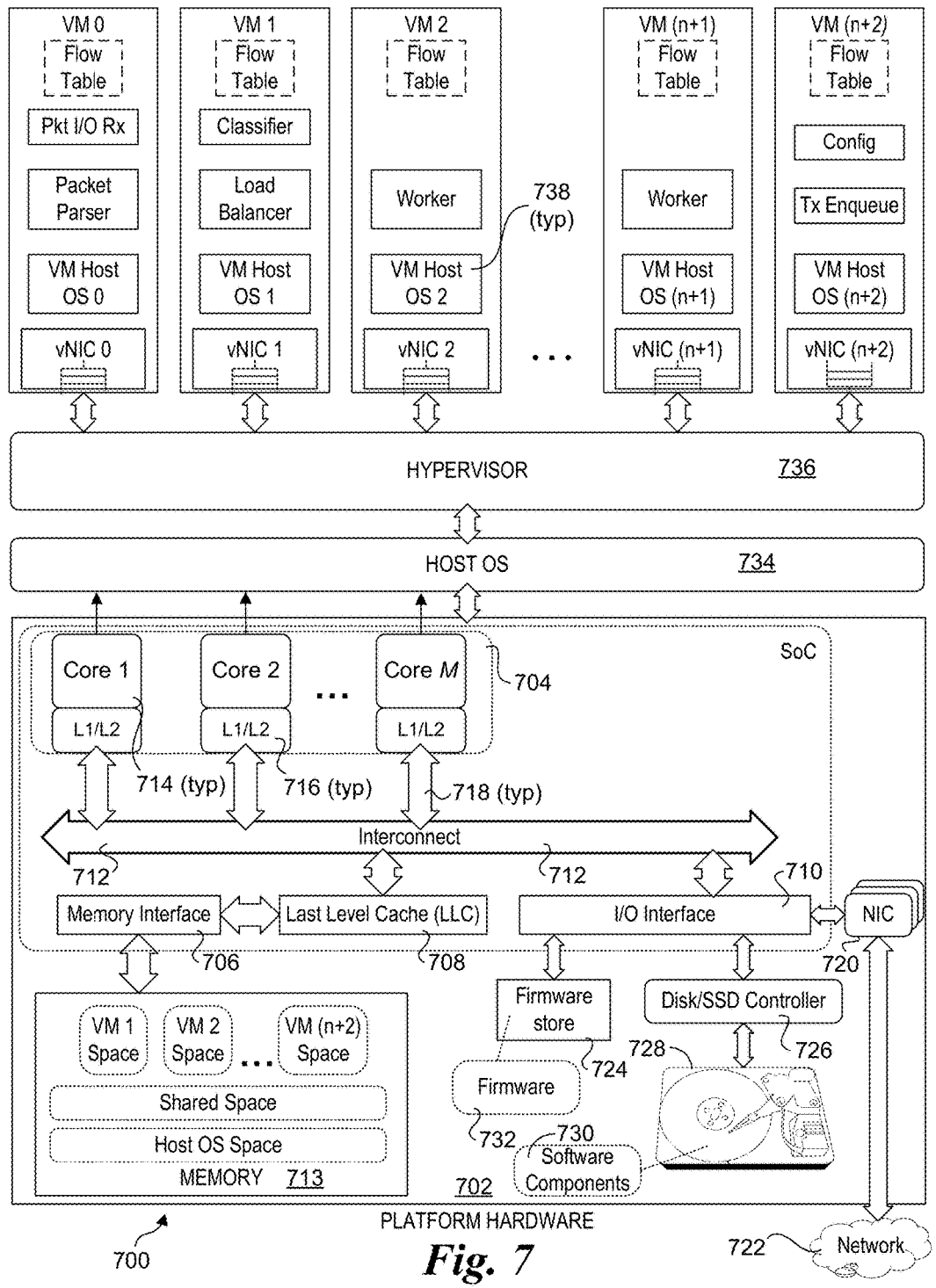
FIG. 7 is a schematic diagram of a host platform hardware and software architecture under which aspect of the embodiments herein may be implemented.

FIG. 7 shows an exemplary host platform configuration 700 including platform hardware 702 and various software-based components configured to implement aspects of the embodiments described herein. Platform hardware 702 includes a central processing unit (CPU) 704 coupled to a memory interface 706, a last level cache (LLC) 708 and I/O interface 710 via an interconnect 712. In some embodiments, all or a portion of the foregoing components may be integrated on a System on a Chip (SoC). Memory interface 706 is configured to facilitate access to system memory 713, which will usually be separate from the SoC.

CPU 704 includes a core portion including M processor cores 714, each including a local level 1 (L1) and level 2 (L2) cache 716. Optionally, the L2 cache may be referred to as a "middle-level cache" (MLC). As illustrated, each processor core 716 has a respective connection 718 to interconnect 712 and operates independently from the other processor cores.

For simplicity, interconnect 712 is shown as a single double-ended arrow representing a single interconnect structure; however, in practice, interconnect 712 is illustrative of one or more interconnect structures within a processor or SoC, and may comprise a hierarchy of interconnect segments or domains employing separate protocols and including applicable bridges for interfacing between the interconnect segments/domains. For example, the portion of an interconnect hierarchy to which memory and processor cores are connected may comprise a coherent memory domain employing a first protocol, while interconnects at a lower level in the hierarchy will generally be used for I/O access and employ non-coherent domains. The interconnect structure on the processor or SoC may include any existing interconnect structure, such as buses and single or multi-lane serial point-to-point, ring, or mesh interconnect structures.

I/O interface 710 is illustrative of various I/O interfaces provided by platform hardware 702. Generally, I/O interface 710 may be implemented as a discrete component (such as an ICH (I/O controller hub) or the like), or it may be implemented on an SoC. Moreover, I/O interface 710 may also be implemented as an I/O hierarchy, such as a Peripheral Component Interconnect Express (PCIe™) I/O hierarchy. I/O interface 710 further facilitates communication between various I/O resources and devices and other platform components. These include one or more NICs 720 that is configured to facilitate access to a network 722, and various other I/O devices, which include a firmware store 724, a disk/SSD controller 726, and a disk drive 728. More generally, disk drive 728 is representative of various types of non-volatile storage devices, including both magnetic- and optical-based storage devices, as well as solid-state storage devices, such as solid state drives (SSDs) or Flash memory.

The multiple cores 714 of CPU 704 are employed to execute various software components 730, such as library components, modules and applications, which are stored in one or more non-volatile storage devices, such as depicted by disk drive 728. Optionally, all or a portion of software components 730 may be stored on one or more storage devices (not shown) that are accessed via a network 722

During boot up or run-time operations, various software components 730 and firmware 732 are loaded into system memory 713 and executed on cores 714 as processes comprising execution threads or the like. Depending on the particular processor or SoC architecture, a given "physical" core may be implemented as one or more logical cores, with processes being allocated to the various logical cores. For example, under the INTEL® Hyperthreading™ architecture, each physical core is implemented as two logical cores.

Under a typical system boot for platform hardware 702, firmware 732 will be loaded and configured in system memory 713, followed by booting a host operating system (OS) 734. Subsequently, a (Type-2) hypervisor 736 (also referred to a Virtual Machine Manager or VMM), which may generally comprise an application running on host OS 734, will be launched. Hypervisor 736 may then be employed to launch various virtual machines, $VM_{0-(n+2)}$, each of which will be configured to use various portions (i.e., address spaces) of system memory 713. In turn, each virtual machine $VM_{0-(n+2)}$ may be employed to host a respective operating system 738.

During run-time operations, hypervisor 736 enables reconfiguration of various system resources, such as system memory 713, cores 714, and disk drive(s) 728. Generally, the virtual machines provide abstractions (in combination with hypervisor 736) between their hosted operating system and the underlying platform hardware 702, enabling the hardware resources to be shared among $VM_{0-(n+2)}$. From the viewpoint of each hosted operating system, that operating system "owns" the entire platform, and is unaware of the existence of other operating systems running on virtual machines. In reality, each operating system merely has access to only the resources and/or resource portions allocated to it by hypervisor 736.

Further aspects of the subject matter described herein are set out in the following numbered clauses:

1. A method performed on a compute platform including a processor operatively coupled to system memory, the compute platform including at least one Network Interface Controller (NIC), each NIC having at least one port, each port including a plurality of NIC transmit (Tx) queues, the method comprising:
   performing software-based packet processing operations to,
   identify a Quality of Service (QoS) class for a packet flow;
   configure a first NIC Tx queue associated with a port on a forwarding NIC via which packets for the packet flow are to be forwarded to effect a first rate limit for packets enqueued in the first NIC Tx queue, the first rate limit to be applied for packets having a QoS class corresponding to the QoS class identified for the packet flow; and
   enqueue a packet associated with the packet flow in the first NIC Tx queue.

2. The method of clause 1, wherein the software-based packet processing operations further:
   determine the packet is a first packet in the packet flow; and
   dynamically configure the first NIC Tx queue to effect the first rate limit.

3. The method of clause 2, wherein the software-based packet processing operations further:
   determine a flow identifier (flow ID) for the first packet in the packet flow;
   create a flow table entry associating the flow ID with the packet flow; and
   create mapping data that maps the first NIC Tx queue that is dynamically configured to the flow ID associated with the packet flow.

4. The method of clause 3, further comprising:
   performing software-based packet-processing operations on a second packet associated with the packet flow received at the first port, wherein the software-based packet-processing operations, determine, via packet classification, a flow ID for the second packet;

perform a lookup of the mapping data using the flow ID for the second packet to determine a NIC Tx queue to enqueue the second packet in, the NIC Tx queue that is determined being the first NIC Tx queue; and enqueue the second packet in the first NIC Tx queue.

5. The method of any of the preceding clauses, wherein the software-based packet processing operations further:

pre-configure a plurality of NIC Tx queues including the first NIC Tx queue on the forwarding NIC to effect rate-limiting for packets enqueued in the plurality of NIC Tx queues, each NIC Tx queue pre-configured to effect a pre-determined rate-limit;

determine a rate-limit to be applied for the packet based on the QoS class for the packet; and enqueue the packet in a NIC Tx queue associated with the port that has been pre-configured to effect a rate-limit corresponding to the QoS class for the packet, wherein the NIC Tx queue is the first NIC Tx queue.

6. The method of clause 5, wherein the software-based packet processing operations further:

determine the packet is the first packet for the packet flow;

determine a flow identifier (flow ID) for the first packet in the packet flow;

create a flow table entry associating the flow ID with the packet flow; and create mapping data that maps the first NIC Tx queue to the flow ID associated with the packet flow.

7. The method of clause 6, further comprising:

performing software-based packet-processing operations on a second packet associated with the packet flow received at the first port, wherein the software-based packet-processing operations, determine, via packet classification, a flow ID for the second packet;

perform a lookup of the mapping data using the flow ID for the second packet to determine a NIC Tx queue to enqueue the second packet in, the NIC Tx queue that is determined being the first NIC Tx queue; and enqueue the second packet in the first NIC Tx queue.

8. The method of any of the preceding clauses, wherein the software-based packet processing operations further:

configure a portion of memory on the forwarding NIC as memory-mapped input-output (MMIO) memory;

configure a queue in the MMIO to be implemented for the first NIC Tx queue; and copy the packet from system memory to the first NIC Tx queue using a Direct Memory Access (DMA) data transfer.

9. The method of any of the preceding clauses, wherein the software-based processing is implemented via execution of instructions included in one or more software libraries in a Data Plane Development Kit (DPDK).

10. The method of any of the preceding clauses, wherein the software-based packet processing operations are performed using multiple threads running on a single operating system on the compute platform, and data is transferred between threads using queues implemented in one or more portions of the system memory configured as shared memory.

11. The method of any of the preceding clauses, wherein the software-based packet processing operations are performed using multiple threads executed via a plurality of virtual machines hosted on the compute platform, and data is transferred between threads using a virtual switch.

12. The method of any of the preceding clauses, wherein software-based packet-processing operations are performed on a plurality of packets received at one or more ports including the first port, and wherein the packet processing operations are implemented using a plurality of stages, including:

a first stage during which received packets are enqueued into system memory and parsed;

a second stage during which packets are classified;

a third stage during which, for each packet, one or more application-specific services are performed; and a fourth stage during which NIC Tx queues are dynamically configured for a portion of the packets and packets are enqueued into the NIC Tx queues that are dynamically configured.

13. The method of any of the preceding clauses, wherein the packet is received at a port of a NIC, further comprising enqueuing the packet into a NIC receive (Rx) queue in the system memory.

14. The method of any of clauses 1-12, wherein the packet is generated by a local application running on the compute platform, further comprising enqueuing the packet into a receive (Rx) queue in the system memory.

15. A non-transitory machine readable medium, having a plurality of instructions stored thereon that are configured to be executed on a processor of a compute platform, the compute platform including at least one Network Interface Controller (NIC), each NIC having at least one port, each port including a plurality of NIC transmit (Tx) queues, wherein execution of the instructions cause the compute platform to:

enqueue a packet into a receive queue in system memory;

associate the packet with a packet flow;

identify a Quality of Service (QoS) class for the packet flow;

perform one or more services on the packet;

configure a first NIC Tx queue associated with a port on a forwarding NIC via which packets for the packet flow are to be forwarded to effect a first rate limit for packets enqueued in the first NIC Tx queue, the first rate limit to be applied for packets having a QoS class corresponding to the QoS class identified for the packet flow; and enqueue the packet in the first NIC Tx queue.

16. The non-transitory machine readable medium of clause 15, wherein execution of the instructions further cause the compute platform to:

determine the packet is a first packet in the packet flow; and dynamically configure the first NIC Tx queue to effect the first rate limit.

17. The non-transitory machine readable medium of clause 16, wherein execution of the instructions further cause the compute platform to:

determine a flow identifier (flow ID) for the first packet in the packet flow;

create a flow table entry associating the flow ID with the packet flow; and create mapping data that maps the first NIC Tx queue that is dynamically configured to the flow ID associated with the packet flow.

18. The non-transitory machine readable medium of clause 17, wherein execution of the instructions further cause the compute platform to:

perform software-based packet-processing operations on a second packet associated with the packet flow received at the first port, the software-based packet-processing operations including,
  determining, via packet classification, a flow ID for the second packet;
  performing a lookup of the mapping data using the flow ID for the second packet to determine a NIC Tx queue to enqueue the second packet in, the NIC Tx queue that is determined being the first NIC Tx queue; and
  enqueuing the second packet in the first NIC Tx queue.

19. The non-transitory machine readable medium of any of clauses 15-18, wherein execution of the instructions further cause the compute platform to:
  pre-configure a plurality of NIC Tx queues including the first NIC Tx queue on the forwarding NIC to effect rate-limiting for packets enqueued in the plurality of NIC Tx queues, each NIC Tx queue pre-configured to effect a pre-determined rate-limit;
  determine a rate-limit to be applied for the packet based on the QoS class for the packet; and
  enqueue the packet in a NIC Tx queue associated with the port that has been pre-configured to effect a rate-limit corresponding to the QoS class for the packet,
  wherein the NIC Tx queue is the first NIC Tx queue.

20. The non-transitory machine readable medium of clause 19, wherein execution of the instructions further cause the compute platform to:
  determine the packet is the first packet for the packet flow;
  determine a flow identifier (flow ID) for the first packet in the packet flow;
  create a flow table entry associating the flow ID with the packet flow; and
  create mapping data that maps the first NIC Tx queue to the flow ID associated with the packet flow.

21. The non-transitory machine readable medium of clause 20, wherein execution of the instructions further cause the compute platform to:
  perform software-based packet-processing operations on a second packet associated with the packet flow received at the first port, the software-based packet-processing operation including,
  determine, via packet classification, a flow ID for the second packet;
  perform a lookup of the mapping data using the flow ID for the second packet to determine a NIC Tx queue to enqueue the second packet in, the NIC Tx queue that is determined being the first NIC Tx queue; and
  enqueue the second packet in the first NIC Tx queue.

22. The non-transitory machine readable medium of any of clauses 15-21, wherein a portion of the instructions comprise instructions included in one or more software libraries in a Data Plane Development Kit (DPDK).

23. The non-transitory machine readable medium of any of clauses 15-22, wherein the packet is received at a port on a NIC and buffered in a memory buffer on the NIC, and wherein execution of the instructions further cause the compute platform to:
  using a direct memory access (DMA) data transfer to enqueue the packet from the memory buffer on the NIC to the receive queue in system memory.

24. The non-transitory machine readable medium of any of clauses 15-22, wherein the packet is generated by a local application running on the compute platform.

25. A compute platform comprising:
  a processor, including a plurality of processor cores;
  system memory, operatively coupled to the processor;
  at least one network interface controller (NIC), each NIC including at least one port and memory, operatively coupled to the processor; and
  a storage device, having a plurality of instructions stored thereon including instructions configured to be executed via one or more of the processor cores to cause the compute platform to,
  enqueue a first packet received at a first port into a receive queue in system memory;
  associate the first packet with a first packet flow;
  identify a Quality of Service (QoS) class for the first packet flow;
  perform one or more services on the first packet;
  configure a first NIC transmit (Tx) queue associated with a second port on a forwarding NIC via which packets for the first packet flow are to be forwarded to effect a first rate limit for packets enqueued in the first NIC Tx queue, the first rate limit to be applied for packets having a QoS class corresponding to the QoS class identified for the first packet flow; and
  enqueue the first packet in the first NIC Tx queue.

26. The compute platform of clause 25, wherein execution of the instructions further cause the compute platform to:
  determine the first packet is a first packet in the first packet flow; and
  dynamically configure the first NIC Tx queue to effect the first rate limit.

27. The compute platform of clause 26, wherein execution of the instructions further cause the compute platform to:
  determine a flow identifier (flow ID) for the first packet in the first packet flow;
  create a flow table entry associating the flow ID with the first packet flow; and
  create mapping data that maps the first NIC Tx queue that is dynamically configured to the flow ID associated with the first packet flow.

28. The compute platform of clause 27, wherein execution of the instructions further cause the compute platform to:
  perform software-based packet-processing operations on a second packet associated with the packet flow received at the first port, the software-based packet-processing operations including,
  determining, via packet classification, a flow ID for the second packet;
  performing a lookup of the mapping data using the flow ID for the second packet to determine a NIC Tx queue to enqueue the second packet in, the NIC Tx queue that is determined being the first NIC Tx queue; and
  enqueuing the second packet in the first NIC Tx queue.

29. The compute platform of clause 25, wherein execution of the instructions further cause the compute platform to:
  pre-configure a plurality of NIC Tx queues including the first NIC Tx queue on the forwarding NIC to effect rate-limiting for packets enqueued in the plurality of NIC Tx queues, each NIC Tx queue pre-configured to effect a pre-determined rate-limit;
  determine a rate-limit to be applied for the first packet based on the QoS class for the first packet; and
  enqueue the first packet in a NIC Tx queue associated with the second port that has been pre-configured to effect a rate-limit corresponding to the QoS class for the first packet,
  wherein the NIC Tx queue is the first NIC Tx queue.

30. The compute platform of clause 29, wherein execution of the instructions further cause the compute platform to:
  determine the first packet is the first packet for the first packet flow;

determine a flow identifier (flow ID) for the first packet in the first packet flow;
create a flow table entry associating the flow ID with the first packet flow; and
create mapping data that maps the first NIC Tx queue to the flow ID associated with the first packet flow.

31. The compute platform of clause 30, wherein execution of the instructions further cause the compute platform to:
perform software-based packet-processing operations on a second packet associated with the packet flow received at the first port, the software-based packet-processing operation including,
determine, via packet classification, a flow ID for the second packet;
perform a lookup of the mapping data using the flow ID for the second packet to determine a NIC Tx queue to enqueue the second packet in, the NIC Tx queue that is determined being the first NIC Tx queue; and
enqueue the second packet in the first NIC Tx queue.

32. The compute platform of any of clauses 25-31, wherein the compute platform is configured to host a local application when operating, and wherein execution of the instructions further cause the compute platform to:
enqueue a second packet generated by the local application into a receive queue in system memory;
associate the second packet with a second packet flow;
identify a QoS class for the second packet flow;
perform one or more services on the second packet;
configure a second NIC Tx queue associated with a port on a forwarding NIC via which packets for the second packet flow are to be forwarded to effect a second rate limit for packets enqueued in the second NIC Tx queue, the second rate limit to be applied for packets having a QoS class corresponding to the QoS class identified for the second packet flow; and
enqueue the second packet in the second NIC Tx queue.

33. The compute platform of any of clauses 25-32, wherein a portion of the instructions comprise instructions included in one or more software libraries in a Data Plane Development Kit (DPDK).

34. The compute platform of any of clauses 25-33, wherein the packet processing operations are performed using multiple threads running on a single operating system on the compute platform, and data is transferred between threads using queues implemented in one or more portions of the system memory configured as shared memory.

35. The compute platform of any of clauses 25-33, wherein the packet processing operations are performed using multiple threads executed via a plurality of virtual machines hosted on the compute platform, and data is transferred between threads using a virtual switch.

36. A method performed on a compute platform including a processor operatively coupled to system memory, the compute platform including at least one Network Interface Controller (NIC), each NIC having at least one port, each port including a plurality of NIC transmit (Tx) queues, the method comprising:
enqueuing a packet in a first queue in the system memory;
performing software-based packet-processing operations on the packet via execution of multiple threads on the processor, wherein the packet-processing operations include,
parsing the packet to extract a packet header and packet payload;
performing packet classification for the packet, the packet classification identifying a packet flow associated with the packet;
identifying a Quality of Service (QoS) class for the packet;
determining a forwarding NIC via which the packet is to be forwarded and a second port on the forwarding NIC to be used for forwarding the packet from the NIC;
enqueuing the packet in a second queue in the system memory;
determining that the QoS class for the packet indicates the packet belongs to a packet flow that is rate-limited;
configuring a first NIC transmit (Tx) queue associated with the second port to effect rate-limiting for packets enqueued in the first NIC Tx queue according to a rate-limit to be effected for the QoS class via hardware on the forwarding NIC; and
enqueuing the packet into the first NIC Tx queue by copying the packet from the second queue in the system memory to the first NIC Tx queue;

37. The method of clause 36, wherein the software-based packet processing operations further comprise:
determining the packet is a first packet in the packet flow; and
dynamically configuring the first NIC Tx queue to effect the first rate limit.

38. The method of clause 37, further comprising:
determining a flow identifier (flow ID) for the first packet in the packet flow;
creating a flow table entry associating the flow ID with the packet flow; and
creating mapping data that maps the first NIC Tx queue that is dynamically configured to the flow ID associated with the packet flow.

39. The method of clause 38, further comprising:
performing software-based packet-processing operations on a second packet associated with the packet flow received at the first port, the software-based packet-processing operation including,
determining, via packet classification, a flow ID for the second packet;
performing a lookup of the mapping data using the flow ID for the second packet to determine a NIC Tx queue to enqueue the second packet in, the NIC Tx queue that is determined being the first NIC Tx queue; and
enqueuing the second packet in the first NIC Tx queue.

40. The method of clause 36, further comprising:
pre-configuring a plurality of NIC Tx queues including the first NIC Tx queue on the forwarding NIC to effect rate-limiting for packets enqueued in the plurality of NIC Tx queues, each NIC Tx queue pre-configured to effect a pre-determined rate-limit;
determining a rate-limit to be applied for the packet based on the QoS class for the packet; and
enqueuing the packet in a NIC Tx queue associated with the port that has been pre-configured to effect a rate-limit corresponding to the QoS class for the packet, wherein the NIC Tx queue is the first NIC Tx queue.

41. The method of clause 40, further comprising:
determining the packet is the first packet for the packet flow;
determining a flow identifier (flow ID) for the first packet in the packet flow;
creating a flow table entry associating the flow ID with the packet flow; and
creating mapping data that maps the first NIC Tx queue to the flow ID associated with the packet flow.

42. The method of clause 41, further comprising:
performing software-based packet-processing operations on a second packet associated with the packet flow received at the first port, the software-based packet-processing operation including,
determining, via packet classification, a flow ID for the second packet;
performing a lookup of the mapping data using the flow ID for the second packet to determine a NIC Tx queue to enqueue the second packet in, the NIC Tx queue that is determined being the first NIC Tx queue; and
enqueuing the second packet in the first NIC Tx queue.

43. The method of any of clauses 36-42, further comprising:
configuring a portion of memory on the forwarding NIC as memory-mapped input-output (MMIO) memory;
configuring a queue in the MMIO to be implemented for the first NIC Tx queue; and
copying the packet from the second queue in system memory to the first NIC Tx queue using a Direct Memory Access (DMA) data transfer.

44. The method of any of clauses 36-43, wherein software-based packet-processing operations are performed on a plurality of packets received at one or more ports including the first port, and wherein the packet processing operations are implemented using a plurality of stages, including:
a first stage during which received packets are enqueued into system memory and parsed;
a second stage during which packets are classified;
a third stage during which, for each packet, one or more application-specific services are performed; and
a fourth stage during which NIC Tx queues are dynamically configured for a portion of the packets and packets are enqueued into the NIC Tx queues that are dynamically configured.

45. The method of any of clauses 36-44, wherein the packet is received at a port of a NIC, further comprising enqueuing the packet into a NIC receive (Rx) queue in the system memory.

46. The method of any of clauses 36-44, wherein the packet is generated by a local application running on the compute platform, further comprising enqueuing the packet into a receive (Rx) queue in the system memory.

47. A non-transitory machine readable medium, having a plurality of instructions stored thereon that are configured to be executed on the processor of the compute platform to enable the compute platform to perform the method of any of clauses 36-46.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc, described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'M', 'N', etc, in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc,), such as recordable/non-recordable media (e.g., read only memory (ROM), random access memory (RAM), magnetic disk storage media, optical storage media, flash memory devices, etc,). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc,), embedded controllers, hardwired circuitry, hardware logic, etc, Software content (e.g., data, instructions, configuration information, etc,) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method performed on a host compute platform including a processor operatively coupled to system memory, the host compute platform including at least one Network Interface Controller (NIC), each NIC including memory separate from the system memory and being coupled to the processor via an input/output (I/O) interface and having at least one port, each port including a plurality of NIC transmit (Tx) queues, the method comprising:
performing software-based packet processing operations via execution of software on the processor to,
access a packet from a NIC receive (Rx) queue in system memory, the packet having been received at a first NIC port associated with the NIC Rx queue and enqueued in the NIC Rx queue;
determine the packet is a first packet in a packet flow;
identify a Quality of Service (QoS) class for the packet flow;
dynamically configure a first NIC Tx queue associated with a port on a forwarding NIC via which packets for the packet flow are to be forwarded to effect a first rate limit for packets enqueued in the first NIC Tx queue, the first rate limit to be applied for packets having a QoS class corresponding to the QoS class identified for the packet flow;
determine a flow identifier (flow ID) for the packet flow;
create a flow table entry associating the flow ID with the packet flow;
create mapping data that maps the first NIC Tx queue that is dynamically configured to the flow ID associated with the packet flow; and
enqueue the packet in the first NIC Tx queue.

2. The method of claim 1 further comprising:
performing software-based packet-processing operations on a second packet associated with the packet flow received at the first port, wherein the software-based packet-processing operations,
determine, via packet classification, a flow ID for the second packet;
perform a lookup of the mapping data using the flow ID for the second packet to determine a NIC Tx queue to enqueue the second packet in, the NIC Tx queue that is determined being the first NIC Tx queue; and
enqueue the second packet in the first NIC Tx queue.

3. The method of claim 1, wherein the software-based packet processing operations further:
pre-configure a plurality of NIC Tx queues including the first NIC Tx queue on the forwarding NIC to effect rate-limiting for packets enqueued in the plurality of NIC Tx queues, each NIC Tx queue pre-configured to effect a pre-determined rate-limit;
determine a rate-limit to be applied for the packet based on the QoS class for the packet; and
enqueue the packet in a NIC Tx queue associated with the port that has been pre-configured to effect a rate-limit corresponding to the QoS class for the packet,
wherein the NIC Tx queue is the first NIC Tx queue.

4. The method of claim 3, wherein the software-based packet processing operations further:
determine the packet is the first packet for the packet flow;
determine a flow identifier (flow ID) for the first packet in the packet flow;
create a flow table entry associating the flow ID with the packet flow; and
create mapping data that maps the first NIC Tx queue to the flow ID associated with the packet flow.

5. The method of claim 4, further comprising:
performing software-based packet-processing operations on a second packet associated with the packet flow received at the first port, wherein the software-based packet-processing operations,
determine, via packet classification, a flow ID for the second packet;
perform a lookup of the mapping data using the flow ID for the second packet to determine a NIC Tx queue to enqueue the second packet in, the NIC Tx queue that is determined being the first NIC Tx queue; and
enqueue the second packet in the first NIC Tx queue.

6. The method of claim 1, wherein the software-based packet processing operations further:
configure a portion of memory on the forwarding NIC as memory-mapped input-output (MMIO) memory;
configure a queue in the MMIO to be implemented for the first NIC Tx queue;
enqueue the packet in a Tx queue in system memory; and
copy the packet from the Tx queue in system memory to the first NIC Tx queue using a Direct Memory Access (DMA) data transfer.

7. The method of claim 1, wherein the software-based processing is implemented via execution of instructions included in one or more software libraries in a Data Plane Development Kit (DPDK).

8. The method of claim 1, wherein the software-based packet processing operations are performed using multiple threads running on a single operating system on the host compute platform, and data is transferred between threads using queues implemented in one or more portions of the system memory configured as shared memory.

9. The method of claim 1, wherein the software-based packet processing operations are performed using multiple threads executed via a plurality of virtual machines hosted on the host compute platform, and data is transferred between threads using a virtual switch.

10. The method of claim 1, wherein software-based packet-processing operations are performed on a plurality of packets received at one or more ports including the first port, and wherein the packet processing operations are implemented using a plurality of stages, including:
   a first stage during which received packets are enqueued into system memory and parsed;
   a second stage during which packets are classified;
   a third stage during which, for each packet, one or more application-specific services are performed; and
   a fourth stage during which NIC Tx queues are dynamically configured for a portion of the packets and packets are enqueued into the NIC Tx queues that are dynamically configured.

11. A non-transitory machine readable medium, having a plurality of instructions stored thereon that are configured to be executed on a processor of a host compute platform, the host compute platform including system memory coupled to the processor and at least one Network Interface Controller (NIC), each NIC having at least one port and memory separate from the system memory, each port including a plurality of NIC transmit (Tx) queues, wherein execution of the instructions on the processor cause the compute platform to:
   enqueue a packet into a receive queue in system memory;
   determine the packet is a first packet in a packet flow and associate the packet with the packet flow;
   identify a Quality of Service (QoS) class for the packet flow;
   perform one or more services on the packet;
   dynamically configure a first NIC Tx queue associated with a port on a forwarding NIC via which packets for the packet flow are to be forwarded to effect a first rate limit for packets enqueued in the first NIC Tx queue, the first rate limit to be applied for packets having a QoS class corresponding to the QoS class identified for the packet flow;
   determine a flow identifier (flow ID) for the packet flow;
   create a flow table entry associating the flow ID with the packet flow;
   create mapping data that maps the first NIC Tx queue that is dynamically configured to the flow ID associated with the packet flow; and
   enqueue the packet in the first NIC Tx queue.

12. The non-transitory machine readable medium of claim 11, wherein execution of the instructions further cause the host compute platform to:
   perform software-based packet-processing operations on a second packet associated with the packet flow received at the first port, the software-based packet-processing operations including,
      determining, via packet classification, a flow ID for the second packet;
      performing a lookup of the mapping data using the flow ID for the second packet to determine a NIC Tx queue to enqueue the second packet in, the NIC Tx queue that is determined being the first NIC Tx queue; and
      enqueuing the second packet in the first NIC Tx queue.

13. The non-transitory machine readable medium of claim 11, wherein execution of the instructions further cause the host compute platform to:
   pre-configure a plurality of NIC Tx queues including the first NIC Tx queue on the forwarding NIC to effect rate-limiting for packets enqueued in the plurality of NIC Tx queues, each NIC Tx queue pre-configured to effect a pre-determined rate-limit;
   determine a rate-limit to be applied for the packet based on the QoS class for the packet; and
   enqueue the packet in a NIC Tx queue associated with the port that has been pre-configured to effect a rate-limit corresponding to the QoS class for the packet,
   wherein the NIC Tx queue is the first NIC Tx queue.

14. The non-transitory machine readable medium of claim 13, wherein execution of the instructions further cause the host compute platform to:
   determine the packet is the first packet for the packet flow;
   determine a flow identifier (flow ID) for the first packet in the packet flow;
   create a flow table entry associating the flow ID with the packet flow; and
   create mapping data that maps the first NIC Tx queue to the flow ID associated with the packet flow.

15. The non-transitory machine readable medium of claim 14, wherein execution of the instructions further cause the host compute platform to:
   perform software-based packet-processing operations on a second packet associated with the packet flow received at the first port, the software-based packet-processing operation including,
      determine, via packet classification, a flow ID for the second packet;
      perform a lookup of the mapping data using the flow ID for the second packet to determine a NIC Tx queue to enqueue the second packet in, the NIC Tx queue that is determined being the first NIC Tx queue; and
      enqueue the second packet in the first NIC Tx queue.

16. The non-transitory machine readable medium of claim 11, wherein a portion of the instructions comprise instructions included in one or more software libraries in a Data Plane Development Kit (DPDK).

17. A host compute platform comprising:
   a processor, including a plurality of processor cores and having at least one input/output (I/O) interface;
   system memory, operatively coupled to the processor;
   at least one network interface controller (NIC), each NIC including at least one port and memory separate from the system memory and including an I/O interface operatively coupled to an I/O interface on the processor; and
   a storage device, having a plurality of instructions stored thereon including instructions configured to be executed via one or more of the processor cores on the processor to cause the compute platform to,
      enqueue a packet received at a first port on a NIC into a receive queue in system memory;
      determine the packet is a first packet in a packet flow and associate the packet with the packet flow;

identify a Quality of Service (QoS) class for the packet flow;

perform one or more services on the packet;

dynamically configure a first NIC transmit (Tx) queue associated with a second port on a forwarding NIC via which packets for the packet flow are to be forwarded to effect a first rate limit for packets enqueued in the NIC Tx queue, the first rate limit to be applied for packets having a QoS class corresponding to the QoS class identified for the packet flow;

determine a flow identifier (flow ID) for the packet flow;

create a flow table entry associating the flow ID with the packet flow;

create mapping data that maps the first NIC Tx queue that is dynamically configured to the flow ID associated with the packet flow; and enqueue the packet in the first NIC Tx queue.

18. The host compute platform of claim 17, wherein execution of the instructions further cause the host compute platform to:

pre-configure a plurality of NIC Tx queues including the first NIC Tx queue on the forwarding NIC to effect rate-limiting for packets enqueued in the plurality of NIC Tx queues, each NIC Tx queue pre-configured to effect a pre-determined rate-limit;

determine a rate-limit to be applied for the packet based on the QoS class for the packet; and enqueue the packet in a NIC Tx queue associated with the second port that has been pre-configured to effect a rate-limit corresponding to the QoS class for the packet, wherein the NIC Tx queue is the first NIC Tx queue.

19. The host compute platform of claim 18, wherein execution of the instructions further cause the host compute platform to:

determine the packet is the first packet for the packet flow;

determine a flow identifier (flow ID) for the first packet in the packet flow;

create a flow table entry associating the flow ID with the packet flow; and create mapping data that maps the first NIC Tx queue to the flow ID associated with the packet flow.

* * * * *